United States Patent
Chen et al.

(10) Patent No.: US 12,151,628 B2
(45) Date of Patent: Nov. 26, 2024

(54) ACTIVE CONDENSATION MITIGATION INSIDE ELECTRONIC ENCLOSURE

(71) Applicant: GM Cruise Holdings LLC, San Francisco, CA (US)

(72) Inventors: Fen Chen, Morgan Hill, CA (US); Gilberto Madrid Gomez, Palo Alto, CA (US); Tyler Sawyer, San Jose, CA (US); Dean Wang, Milpitas, CA (US); Arul Ramalingam, Fremont, CA (US); Timothy Seto, Campbell, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 250 days.

(21) Appl. No.: 17/881,563

(22) Filed: Aug. 4, 2022

(65) Prior Publication Data

US 2024/0042953 A1 Feb. 8, 2024

(51) Int. Cl.
*B60R 16/02* (2006.01)
*B60H 1/00* (2006.01)
*B60R 16/023* (2006.01)
*H02B 1/56* (2006.01)

(52) U.S. Cl.
CPC ..... *B60R 16/0239* (2013.01); *B60H 1/00785* (2013.01); *H02B 1/56* (2013.01)

(58) Field of Classification Search
CPC .... B60R 16/0239; B60H 1/00785; H02B 1/56
See application file for complete search history.

(56) References Cited

U.S. PATENT DOCUMENTS

| | | | | |
|---|---|---|---|---|
| 7,571,637 | B2* | 8/2009 | Chen | G01N 27/223 73/73 |
| 11,653,480 | B1* | 5/2023 | Vines | H05K 5/0212 701/23 |
| 2008/0310112 | A1* | 12/2008 | Long | H05K 5/0213 62/132 |
| 2013/0160522 | A1* | 6/2013 | Kromrey | G01R 31/3835 324/426 |
| 2023/0085349 | A1* | 3/2023 | Lundgren | H05K 7/20136 361/689 |
| 2024/0255169 | A1* | 8/2024 | Stefanoski | F24F 3/1411 |

\* cited by examiner

*Primary Examiner* — Marc E Norman
(74) *Attorney, Agent, or Firm* — Michael DiCato

(57) ABSTRACT

Particular embodiments described herein provide for a system and method to help prevent condensation inside an enclosure that includes an electronic system. The system and method can determine a current relative humidity of an environment inside an enclosure that houses the electronic system, use the current relative humidity and the current maximum temperature to determine a dew point for the environment inside the enclosure, activate one or more heating elements inside the enclosure when the current minimum temperature is the same or lower than the dew point for the environment inside the enclosure, activate one or more embedded fans, and open one or more vents to help purge moisture out of the system during heating. When the current minimum temperature is higher than the dew point for the environment inside the enclosure, the system and method can allow the electronic system to power on.

8 Claims, 18 Drawing Sheets

ACTIVE CONDENSATION MITIGATION INSIDE ELECTRONIC ENCLOSURE

TECHNICAL FIELD OF THE DISCLOSURE

The present disclosure relates generally to a vehicle and, more specifically, to a system and method to help enable active condensation mitigation inside an electronic enclosure.

BACKGROUND

An autonomous vehicle (AV) is a vehicle that is capable of sensing and navigating its environment with little or no user input. The AV may sense its environment using sensing devices such as radio detection and ranging (RADAR), light detection and ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying FIGURES, wherein like reference numerals represent like parts, in which.

Figure 1A:
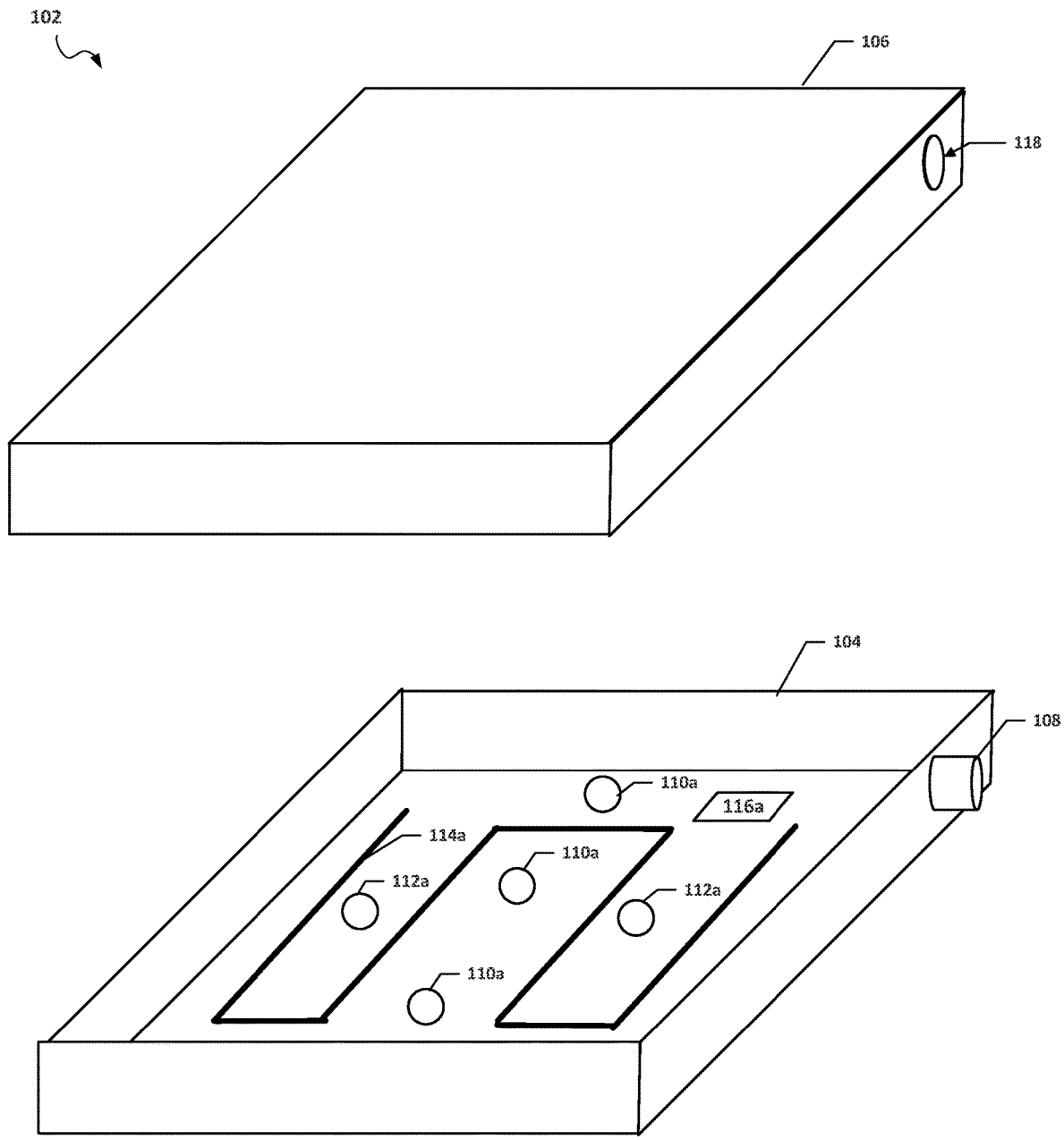
FIGS. 1A-1C show an electronic enclosure according to some embodiments of the present disclosure.

The FIGURES of the drawings are not necessarily drawn to scale, as their dimensions can be varied considerably without departing from the scope of the present disclosure.

DESCRIPTION OF EXAMPLE EMBODIMENTS OF THE DISCLOSURE

Overview

The demand for autonomous vehicle (AV) ride hail and rideshare has been rising. However, many services cannot meet the rising demand due to high costs and technical challenges. For example, an AV can be relatively expensive and requires a complex system of sensors to allow the AV to safely navigate in the environment. Sometimes a sensor or other component of the AV can become disabled or inoperable and render the AV disabled. The disabled AV can create an unsafe environment, especially if the AV is disabled on a road and is blocking traffic.

For example, the electronics used for an AV are housing inside an enclosure to help protect the electronics from the environment (e.g., debris, liquid splashes and spills, etc.). The AV is used outside in an uncontrolled environment where weather conditions can fluctuate as well as other environmental conditions, especially temperature and humidity. Due to the enclosure's exposure to environmental conditions, condensation inside and outside of the enclosure can occur, especially when the temperature is near or below the dew point. The condensation will not only prevent the electronics of the AV to start and operate, but also will cause safety concerns as the condensation can create a short and, in some cases, a burned printed circuit board (PCB) and even a fire.

In some examples, the electronics inside the enclosure can be cooled by a liquid cooling system (e.g., a liquid-cooled cold plate). If the temperature of the liquid cooling system inside the enclosure is lower than the ambient air dew point, condensation can occur. Condensation is a change in the state of water from a gas or vapor form into a liquid form. Condensation generally occurs when vapor in warm air encounters a cool surface. If the enclosure is used in a system that is exposed to the outside environment and the electronics inside the enclosure are cooled with a liquid cooling system, condensation is likely to occur. Water and water film due to condensation can lead the electronic components inside the enclosure to show electrical performance deteriorations and failures. Therefore, improved technology to help enable an active condensation mitigation inside an electronic enclosure is needed.

A system and method to help enable an active condensation mitigation inside an electronic enclosure can help to overcome some of these problems. More specifically, in an illustrative example, a heating element inside the enclosure can be used to heat wet air inside the enclosure if the relative humidity is high or condensation is detected inside the enclosure. The hot air can absorb the moisture in the enclosure of water as water readily evaporates into the hot air. An air vent can be open to allow the air and the water in the air to escape the enclosure and the heat can drive the wet hot air out of the enclosure relatively quickly (as compared to air that is not heated). In some examples, an air mover can help circulate air inside the enclosure to help evenly spread the heating from heating elements in the enclosure, move moist air out through the vent, and/or help speed up the dry-out process and removal of condensation from the enclosure. The air mover can be a fan or some other type of device or component that can move the air inside the enclosure. The air vent can be closed when low relative humidity is reached inside the enclosure and the heating element and air mover can be turned off. During the operation of the system, the electronics generate enough heat to help prevent condensation.

Condensation occurs when warmer moist air comes in contact with cold surfaces such as a cold plate, especially a liquid cooled cold plate. Warm air, having the ability to contain more moisture than cold air, loses the ability to retain the moisture when the warm air comes in contact with cool or cold surfaces or regions. When that happens, excessive moisture in the air is released in the form of condensation. The dew point is the temperature at which water vapor in any static or moving air will condense into water. In other words, the air is saturated and can no longer hold the moisture at the dew point temperature. When the air temperature drops below the dew point, excess moisture will be released in the form of condensation.

The relative humidity is a percentage measurement of the amount of water vapor present in the air in relation to the amount it is capable of holding at that temperature. For example, fifty percent relative humidity indicates the air is carrying one-half of the maximum amount of moisture that the air is capable of containing at the given temperature. There is a relationship between the dew point and relative humidity. A high relative humidity means that the dew point is near the current air temperature. Therefore, a relative humidity of 100% indicates that the dew point is equal to the current temperature. By determining the humidity in the enclosure using one or more humidity sensors and the temperature using one or more temperature sensors, the dew point can be calculated. To help avoid condensation inside the enclosure, the system can determine if the temperature inside the enclosure needs to be raised so the temperature inside the enclosure is above the dew point and condensation can be prevented or at least mitigated.

As used herein, the term "humidity sensor" includes a relative humidity sensor. Humidity sensors can be divided into two groups, relative humidity sensors and absolute humidity sensors, and each group uses a different method to calculate humidity. For relative humidity sensors, the relative humidity is calculated by comparing the live humidity reading at a given temperature to the maximum amount of humidity for air at the same temperature. Relative humidity sensors must therefore measure temperature in order to determine relative humidity. In contrast, absolute humidity is measured without reference to temperature.

The two most common relative humidity sensors are capacitive relative humidity sensors and resistive relative humidity sensors. Capacitive relative humidity sensors use two electrodes to monitor the capacitance of a thin metal strip (e.g., metal oxide) between the electrodes. The thin metal strip's capacitance increases or decreases at a rate that is directly proportional to the change of humidity in the sensor's environment. The difference in charge (voltage) generated by an increase in humidity is then amplified and sent to the humidity module (e.g., the humidity module 304 illustrated in FIG. 3). A resistive relative humidity sensor utilizes a small polymer comb that increases and decreases in size as the humidity changes. The change in the size of the small polymer comb directly affects the system's ability to store charge. Both the capacitive relative humidity sensors and resistive relative humidity sensors (or hygrometer) sense, measure and report both moisture and air temperature.

The ratio of moisture in the air to the highest amount of moisture at a particular air temperature is the relative humidity.

Thermal humidity sensors are used to measure absolute humidity. Unlike relative humidity sensors, thermal humidity sensors utilize two probes. One probe measures dry nitrogen and the other probe measures the air in the surrounding environment. When humidity is collected on the exposed probe, the difference in thermal conductivity between the two probes is measured and absolute humidity is calculated.

Embodiments of the present disclosure provide a system and method to help enable active condensation mitigation inside an electronic enclosure. The enclosure can include a first housing and a second housing. The first housing includes at least one first housing temperature sensor, at least one first housing humidity sensor, at least one first housing heating element, and a heating element activation module to control activation and de-activation of the at least one first housing heating element. The second housing includes at least one second housing temperature sensor, at least one second housing humidity sensor, and at least one second housing heating element. The first housing is coupled to the second housing to create the enclosure for the electronic system. the first housing and/or the second housing can include one or more vents and the heating element activation module controls the opening and closing of each of the one or more vents. The heating element activation module independently controls activation and de-activation of each one of the plurality of first housing heating elements. The enclosure can also include a battery separate from the battery of the electronic system, where the heating element activation module is discrete and separate from the electronic system. In some examples, the at least one first housing heating element and/or the at least one second housing heating element are activated when a temperature in the enclosure is near or below a dew point. In other examples, the at least one first housing heating element and/or the at least one second housing heating element are activated when a temperature in the enclosure is near or below a minimum operating temperature of the electronic system. The at least one first housing heating element and the at least one second housing heating element can be metal wires. At least one first housing heating element is embedded into the first housing and at least one second housing heating element is embedded into the second housing. In some examples, the electronic system includes a liquid cooled cold plate. The electronic system can be an onboard controller for a vehicle. In some examples, the vehicle is an autonomous vehicle and the enclosure is located behind a seat of the vehicle.

In an example, a method can include determining a current relative humidity of an environment inside the enclosure, determining a current maximum temperature of the environment inside the enclosure, using the current relative humidity and the current maximum temperature to determine a dew point for the environment inside the enclosure, determining a current minimum temperature of the environment inside the enclosure, and activating one or more heating elements inside the enclosure when the current minimum temperature is the same or lower than the dew point for the environment inside the enclosure. The method can also include de-activating the one or more heating elements in the enclosure when the current minimum temperature is higher than the dew point for the environment inside the enclosure. In some examples, the method can include opening one or more vents in the enclosure when the current minimum temperature is the same or lower than the dew point for the environment inside the enclosure. The one or more vents elements can each independently controlled. The method can include closing the one or more vents in the enclosure when the current minimum temperature is higher than the dew point for the environment inside the enclosure. The method can also include, determining that the electronic system has been activated and allowing the system to power on when the current minimum temperature is higher than the dew point for the environment inside the enclosure.

As will be appreciated by one skilled in the art, aspects of the present disclosure, in particular aspects of the system and method to help enable active condensation mitigation inside an electronic enclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as an "engine," a "circuit," a "module," or a "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied (e.g., stored) thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings. Other features and advantages of the disclosure will be apparent from the following description and the claims.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y. The terms "substantially," "close," "approximately," "near," and "about," generally refer to being within +/−20% of a target value (e.g., about 10 meters includes between 8 meters and 12 meters and/or within +/−5 or 10% of a target value) based on the context of a particular value as described herein or as known in the art. In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings. As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

It is to be understood that other embodiments may be utilized and structural changes may be made without departing from the scope of the present disclosure. Substantial flexibility is provided by an electronic device in that any suitable arrangements and configurations may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Exemplary Enclosure System

Figure 1B:
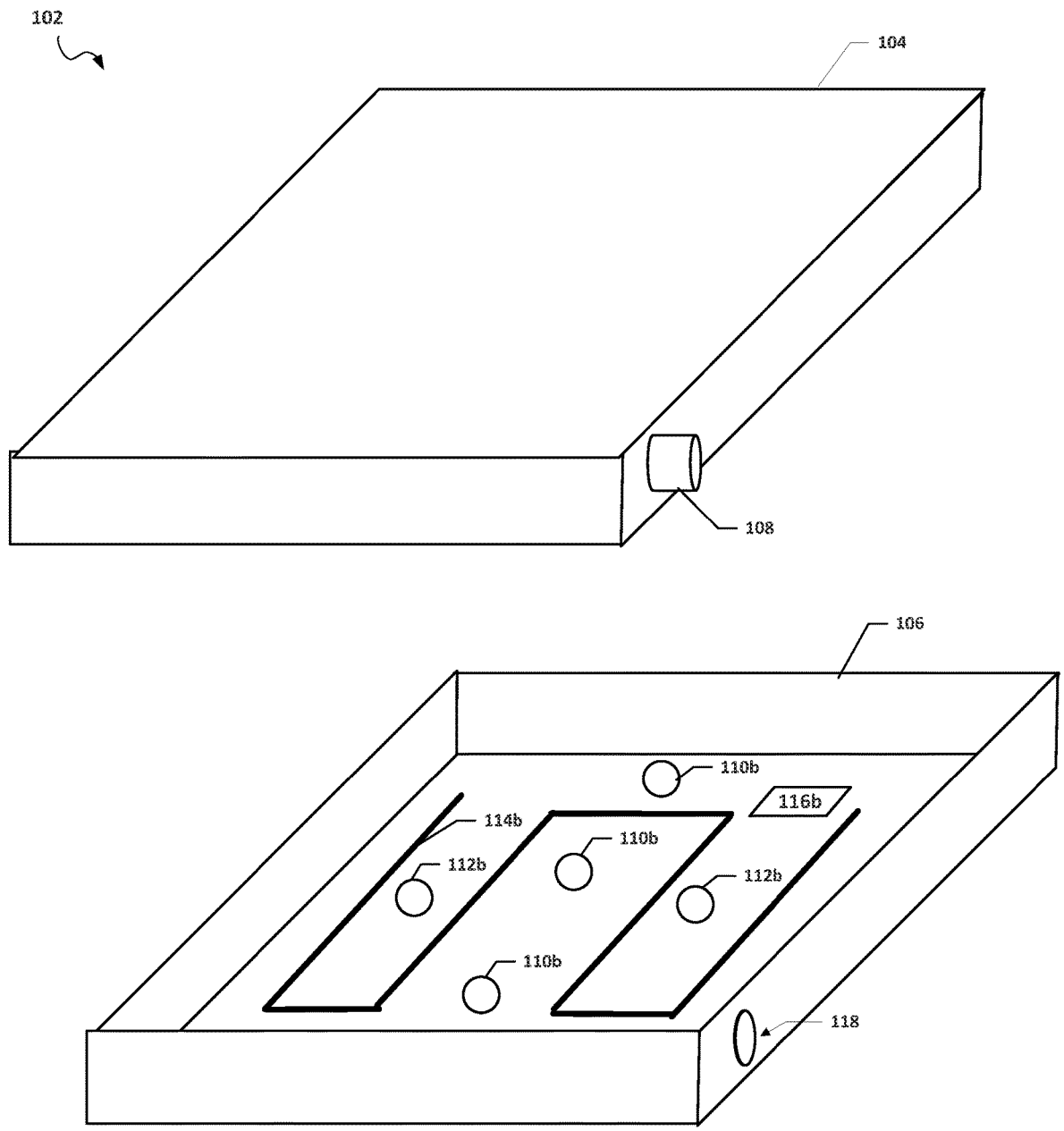
Figure 1C:
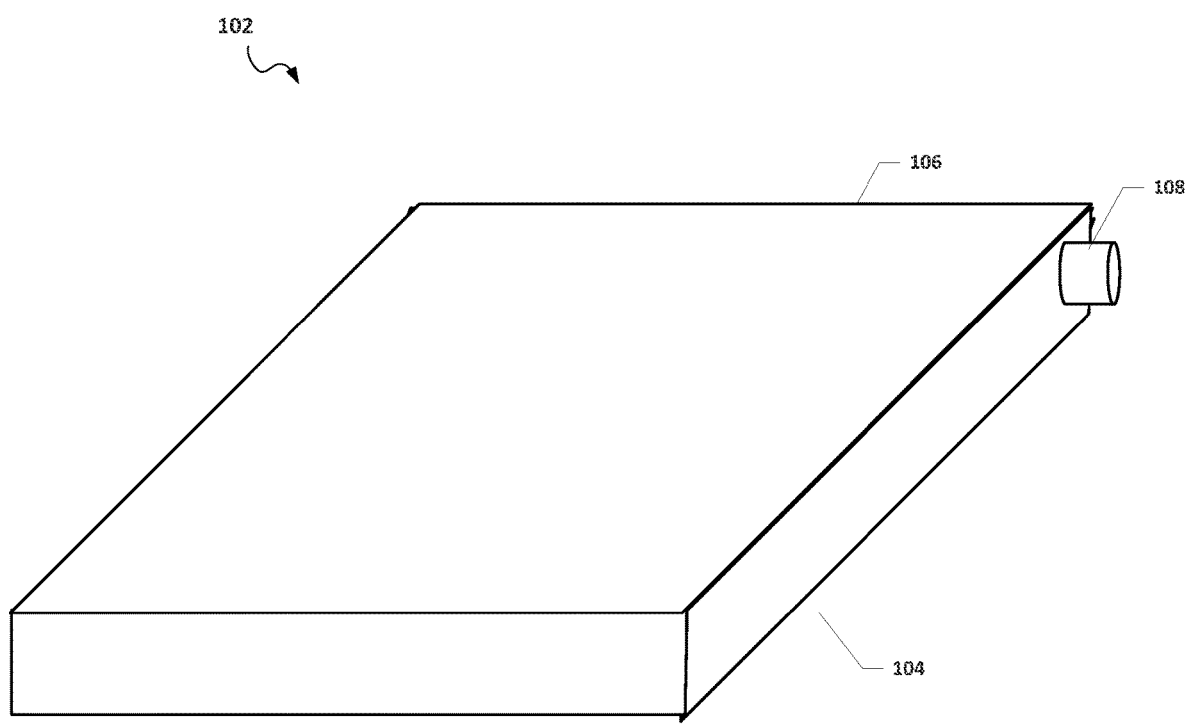
Figure 9:
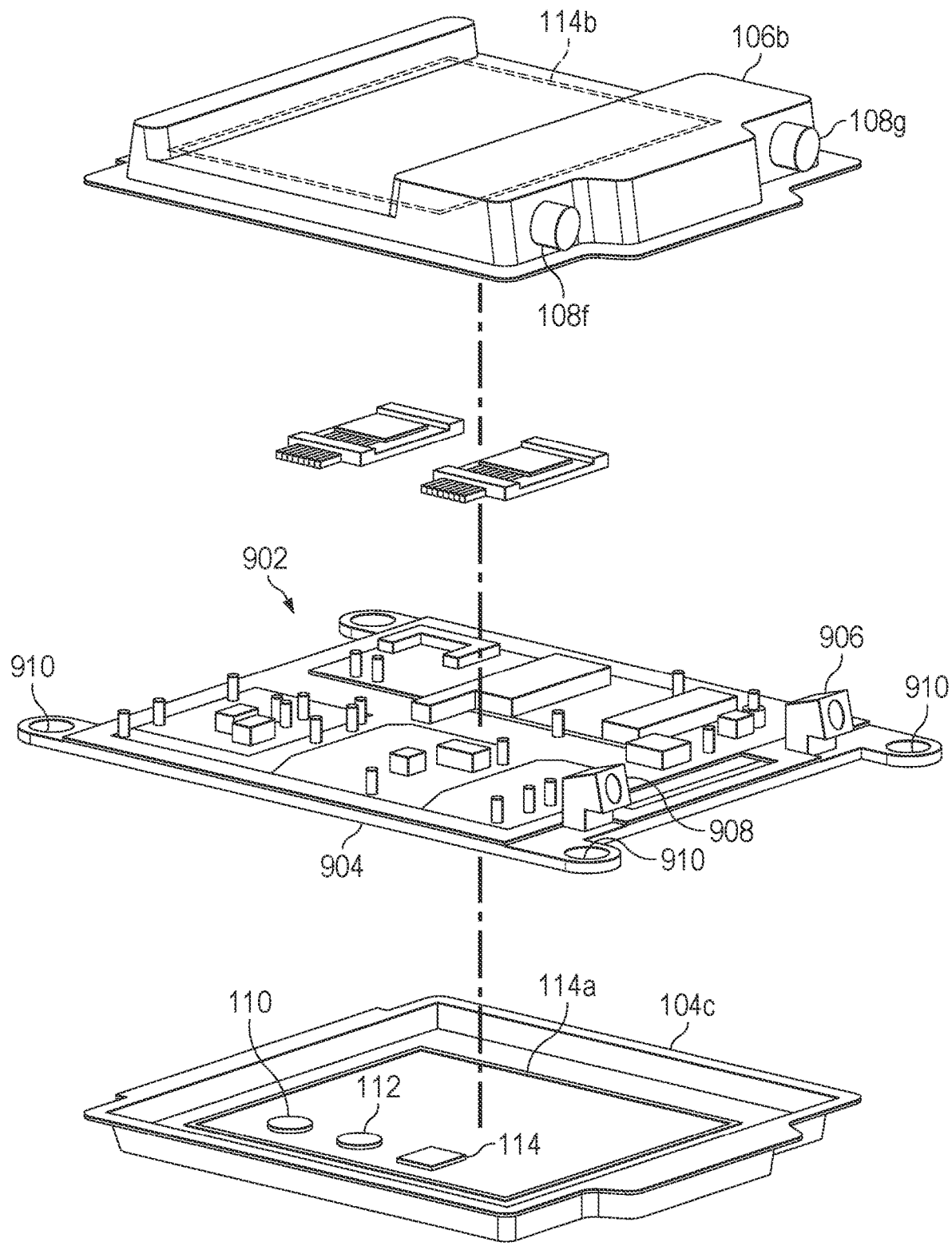
FIG. 9 illustrates an example system summary according to some embodiments of the present disclosure.
Figure 10:
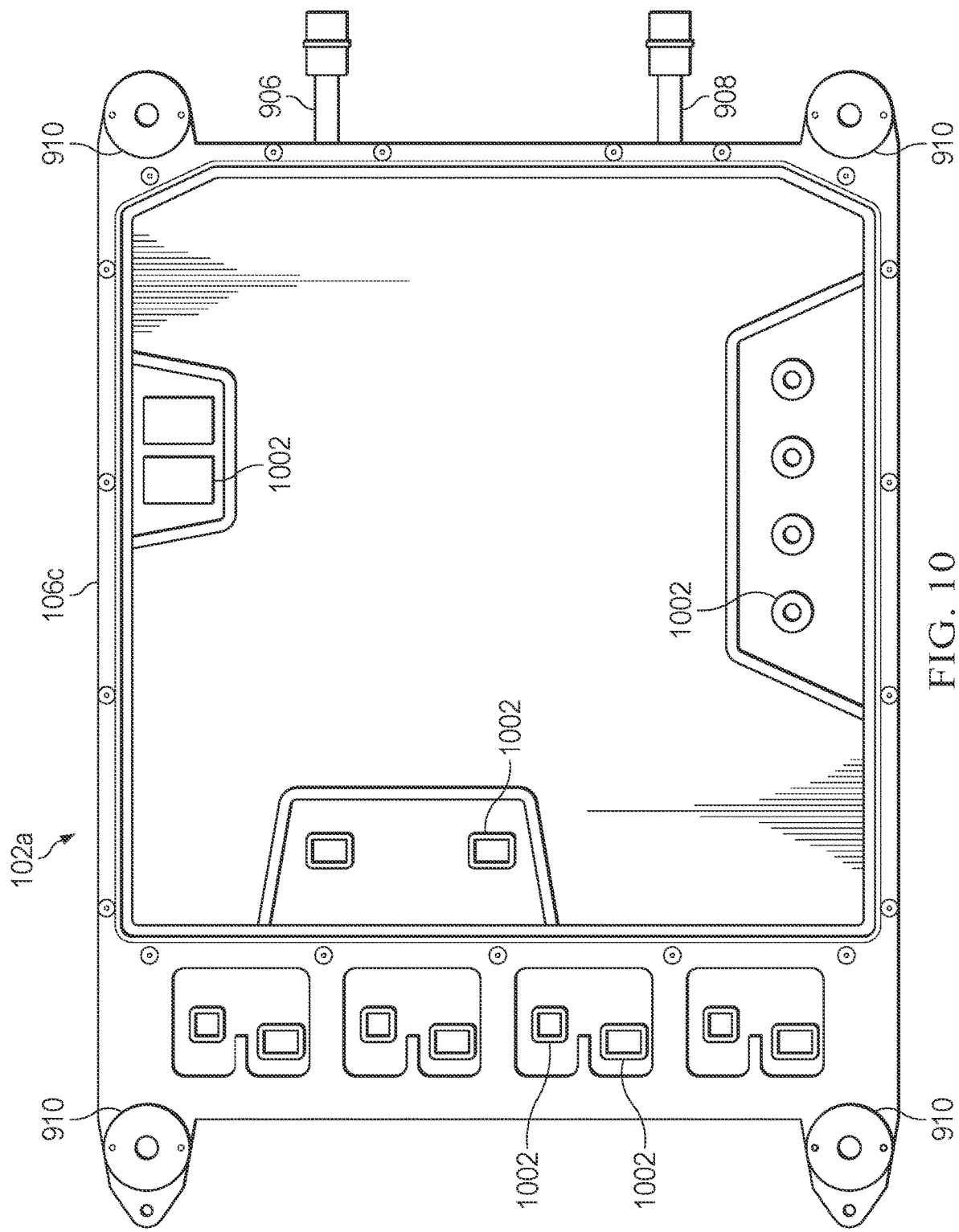
FIG. 10 illustrates an example system summary according to some embodiments of the present disclosure.

FIGS. 1A-1C shows a portion of a system help enable active condensation mitigation inside an electronic enclosure according to some embodiments of the present disclosure. In an example, an enclosure 102 can include a first housing 104 and a second housing 106. The enclosure 102 can be comprised of metal, plastic, or some other material that can help protect components inside of the enclosure 102 from the environment outside of the enclosure (e.g., debris, liquid splashes and spills, etc.). The first housing 104 can be secured to the second housing 106 to create the enclosure 102 (e.g., as illustrated in FIG. 1C). In some examples, the first housing 104 and the second housing 106 overlap and at least a portion of the second housing 106 can slide or fit inside the first housing 104. In other examples, the first housing 104 and the second housing 106 are coupled together so one housing is on top of the other housing (e.g., as illustrated in FIGS. 9 and 10) and the one housing does not extend into the other housing.

The first housing 104 can include a vent 108, one or more temperature sensors 110a, one or more humidity sensors 112a, a heating element 114a, and a heating element activation module 116a. The second housing 106 can include a vent opening 118. As illustrated in FIG. 1A, the first housing 104 includes three temperature sensors 110a and two humidity sensors 112a, however, the number of the temperature sensors 110a and the number of the humidity sensors 112a can vary from what is illustrated in FIG. 1A and depends on design constraints and design choice. For example, a very small enclosure 102, and thus a very small first housing 104, could have fewer temperature sensors 110a and/or humidity sensors 112a than a very large enclosure with a very large first housing 104. Also, the location of the temperature sensors 110a and the humidity sensors 112a can vary from what is illustrated in FIG. 1A and depends on design constraints and design choice. The heating element 114a can be a conductive element that heats up when a current is passed through the heating element 114a (e.g., a metal wire). In addition, the heating element 114a can be embedded into the first housing 104. The heating element 114a can be a resistance wire heating element and may be in coil and ribbon formats instead of strips. In some examples, the heating element 114a can be comprised of metallic alloys. In addition, ceramic and semiconductor heating elements, thick film heating elements, polymer PTC heating elements, and/or composite heating elements may be used alone or in combination to create the heating element 114a.

As illustrated in FIG. 1B, the second housing 106 can also include one or more temperature sensors 110b, one or more humidity sensors 112b, a heating element 114b, a heating element activation module 116b, and vent opening 118. The first housing 104 can include the vent 108. When the first housing 104 is coupled to the second housing 106 to create the enclosure 102, the vent opening 118 lines up with the vent 108 to allow air to pass through from the inside of the enclosure 102 to the environment outside of the enclosure 102. As illustrated in FIG. 1B, the second housing 106 includes three temperature sensors 110b and two humidity sensors 112b, however, the number of the temperature sensors 110b and the number of the humidity sensors 112b can vary from what is illustrated in FIG. 1B and depends on design constraints and design choice. For example, a very small enclosure 102, and thus a very small second housing 106 could have fewer temperature sensors 110b and/or humidity sensors 112b than a very large enclosure with a very large second housing 106. Also, the location of the temperature sensors 110b and the humidity sensors 112b can vary from what is illustrated in FIG. 1B and depends on design constraints and design choice. The heating element 114b can be a conductive element that heats up when a current is passed through the heating element 114b (e.g., a metal wire). In addition, the heating element 114b can be embedded into the second housing 106. Also, while the first housing 104 and the second housing 106 have the same number and same location for each of the one or more temperature sensors 110, the one or more humidity sensors 112, the heating element 114, and the heating element activation module 116 in each of the first housing 104 and the second housing 106, the number and location of each of the one or more temperature sensors 110, the one or more humidity sensors 112, the heating element 114, and the a heating element activation module 116 in each of the first housing 104 and the second housing 106 can be different.

In an example, based on the readings from the one or more temperature sensors 110 and the one or more humidity sensors 112, the heating element activation module 116 can activate the heating element 114 to heat the air inside the enclosure 102. More specifically, if temperature of the air inside the enclosure 102 is at or near the dew point, the heating element activation module 116a can activate the heating element 114a in the first housing 104 and the heating element activation module 116b can activate the heating element 114b in the second housing 106 to heat the air inside the enclosure 102 above the dew point to help prevent condensation inside the enclosure 102. When the heating elements 114a and 114b are activated, the heating element activation module 116a can also open the vent 108 to allow warm moist air to escape. When the temperature of the air inside the enclosure 102 is above the dew point, the heating element activation module 116a can de-activate the heating element 114a in the first housing 104 and the heating element activation module 116b can de-activate the heating element 114b in the second housing 106. In addition, the heating element activation module 116a closes the vent 108 to help keep cold moist air from entering the enclosure 102. In some examples, the heating element activation module 116a in the first housing 104 can function independently of the heating element activation module 116b in the second housing 106. In other examples, the heating element activation module 116a in the first housing 104 can control the heating element activation module 116b in the second housing 106.

In another example implementation, based on readings from the one or more temperature sensors 110a, the heating element activation module 116a can activate the heating element 114a in the first housing 104 and/or, based on readings from the one or more temperature sensors 110b, the heating element activation module 116b can activate the heating element 114b in the second housing 106 to heat the air inside the enclosure 102 when the temperature inside the enclosure is determined to be a cold environment. The term "cold environment" includes an environment where the ambient temperature and/or the temperature of the electronics inside the enclosure is below the minimum recommended operating temperature or minimum operating temperature of the electronics inside the enclosure. For example, many processors have a recommended operating temperature above zero degrees Celsius so the cold environment for those processors would be where the ambient temperature and/or temperature of the electronic inside the enclosure is below zero degrees Celsius. When a system is in a cold environment, the system may not operate properly and can become unstable because most capacitors do not work properly when the temperature is below a threshold. The heating element activation module 116 can activate the heating element 114 to heat the air inside the enclosure 102 to a temperature at or above the minimum recommended operating temperature or minimum operating temperature of the electronic inside the enclosure.

Figure 2A:
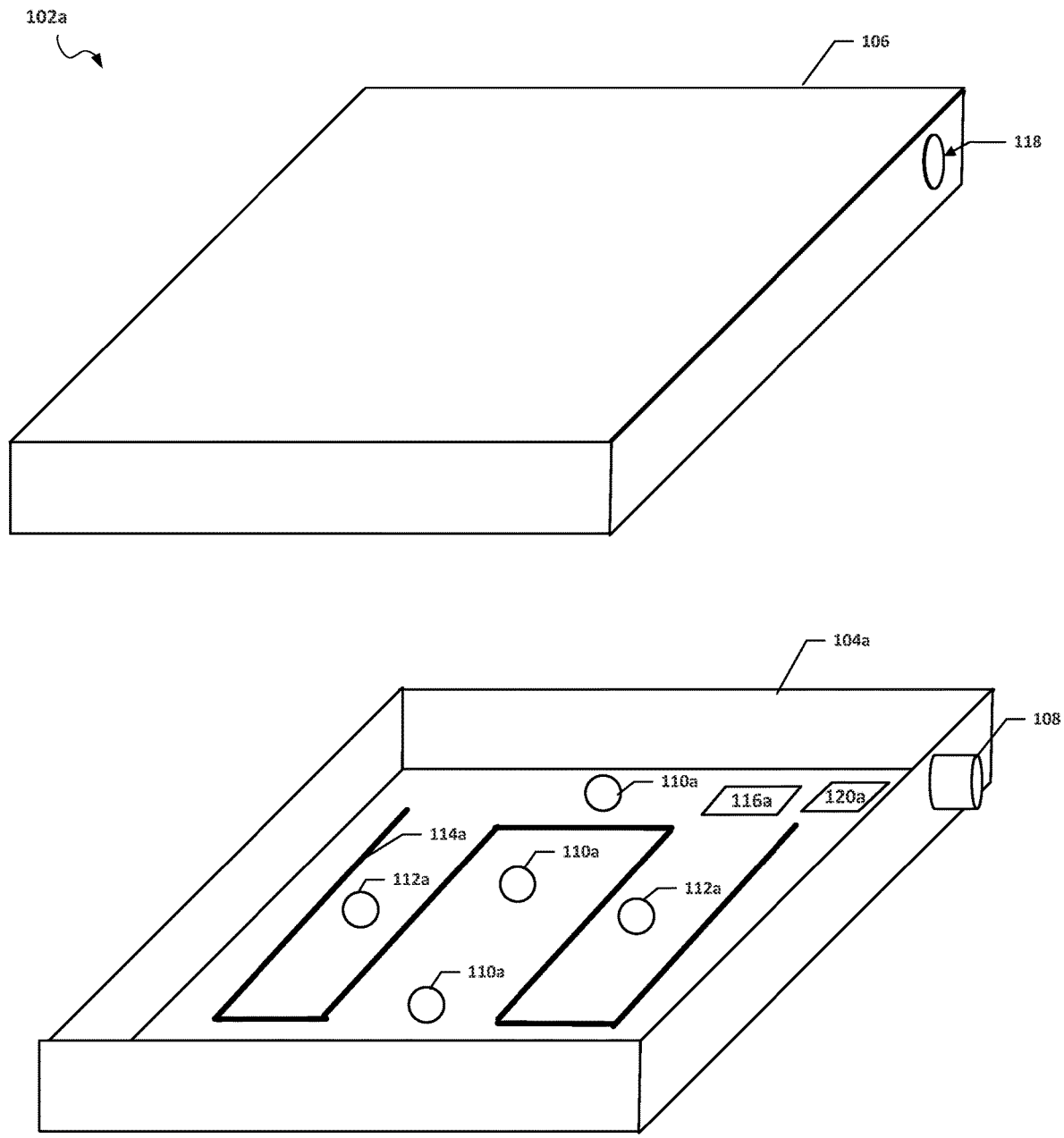
FIGS. 2A-2C illustrate example system summaries according to some embodiments of the present disclosure.

FIG. 2A illustrates a portion of a system help enable active condensation mitigation inside an electronic enclosure according to some embodiments of the present disclosure. In an example, an enclosure 102a can include a first housing 104a and the second housing 106. The enclosure 102a can be comprised of metal, plastic, or some other material that can help protect components inside of the enclosure 102a from the environment outside of the enclosure (e.g., debris, liquid splashes and spills, etc.). The first housing 104a can be secured to the second housing 106 to create the enclosure 102a (e.g., similar to the enclosure 102 illustrated in FIG. 1C). In some examples, the first housing 104a and the second housing 106 overlap and at least a portion of the second housing 106 can slide or fit inside the first housing 104a. In other examples, the first housing 104a and the second housing 106 are coupled together so one housing is on top of the other housing (e.g., as illustrated in FIGS. 9 and 10) and the one housing does not extend into the other housing.

The first housing 104a can include the vent 108, the one or more temperature sensors 110a, the one or more humidity sensors 112a, the heating element 114a, the heating element activation module 116a, and an air mover 120a. The air mover 120a can be a fan or some other type of device or component that can move the air inside the enclosure 102a, help to evenly spread the heating from the heating element 114a, move moist air out through the vents, and/or help speed up the dry-out process and removal of condensation from the enclosure 102. The second housing 106 can include the vent opening 118. As illustrated in FIG. 2A, the first housing 104 includes one air mover 120a, however, the number of the air movers 120a can vary from what is illustrated in FIG. 2A and depends on design constraints and design choice. For example, a very small enclosure 102a, and thus a very small first housing 104a, could have one air mover 120a or fewer air movers 120a than a very large enclosure with a very large first housing 104a. Also, the location of the air mover 120a can vary from what is illustrated in FIG. 2A and depends on design constraints and design choice. In some examples, the air mover 120a is located near the vent 108.

In an example, based on the readings from the one or more temperature sensors 110a and the one or more humidity sensors 112a, the heating element activation module 116a can activate the heating element 114a to heat the air inside the enclosure 102a and can activate the air mover 120a to circulate the air inside the enclosure 102a. More specifically, if temperature of the air inside the enclosure 102a is at or near the dew point, the heating element activation module 116a can activate the heating element 114a to heat the air inside the enclosure 102a above the dew point to help prevent condensation inside the enclosure 102a and the air mover 120a can be activated to help circulate the warm air inside the enclosure 102a. When the heating element 114a is activated, the heating element activation module 116a can also open the vent 108 to allow warm moist air that is being circulated by the air mover 120a to escape the enclosure 102a. When the temperature of the air inside the enclosure 102a is above the dew point, the heating element activation module 116a can de-activate the heating element 114a and the air mover 120a. In addition, the heating element activation module 116a closes the vent 108 to help keep cold moist air from entering the enclosure 102a.

Figure 2B:
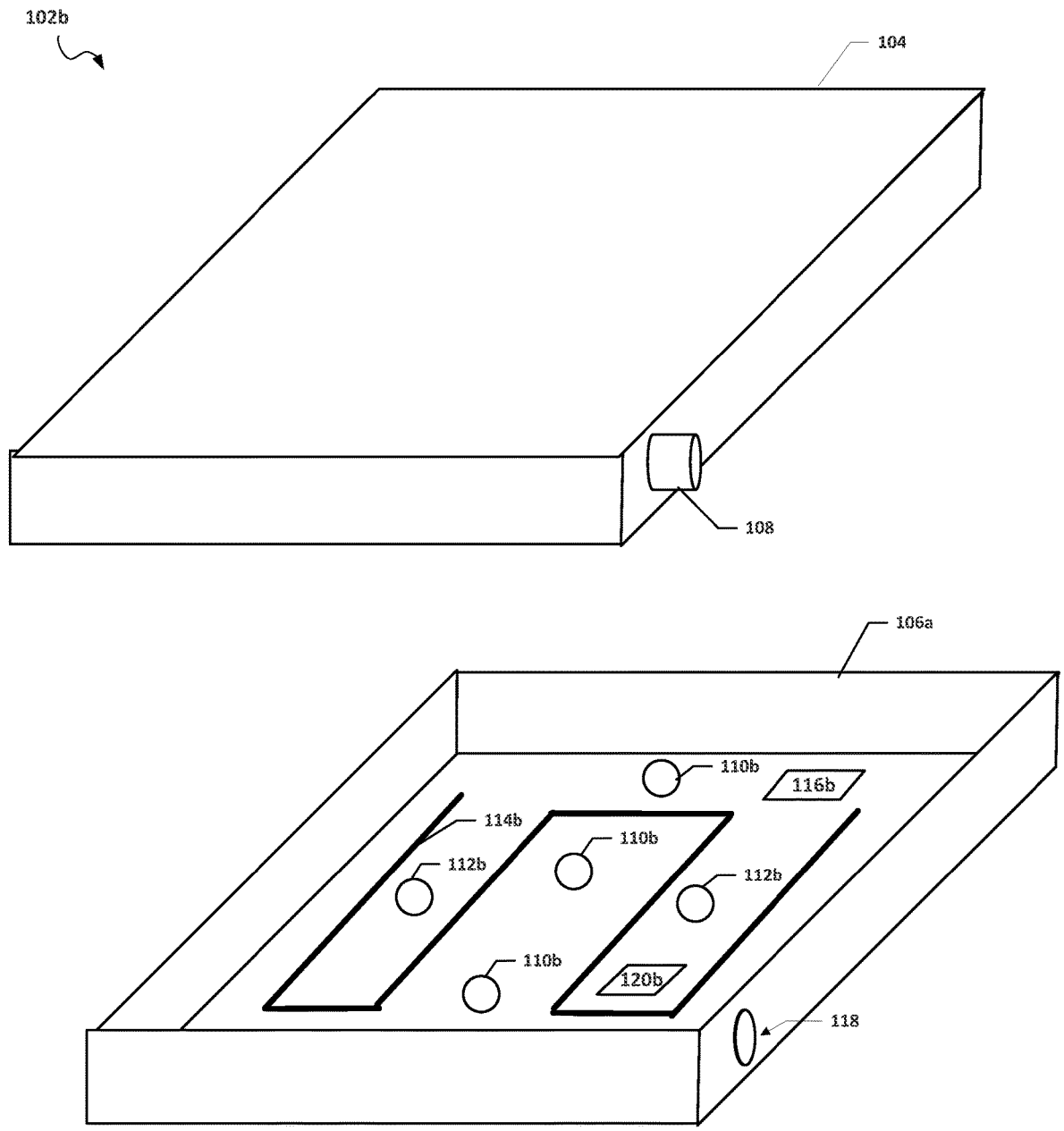

FIG. 2B illustrates a portion of a system help enable active condensation mitigation inside an electronic enclosure according to some embodiments of the present disclosure. An enclosure 102b can include the first housing 104 and a second housing 106a. The enclosure 102b can be comprised of metal, plastic, or some other material that can help protect components inside of the enclosure 102b from the environment outside of the enclosure (e.g., debris, liquid splashes and spills, etc.). The first housing 104 can be secured to the second housing 106a to create the enclosure 102b (e.g., similar to the enclosure 102 illustrated in FIG. 1C). In some examples, the first housing 104 and the second housing 106a overlap and at least a portion of the second housing 106a can slide or fit inside the first housing 104. In other examples, the first housing 104 and the second housing 106a are coupled together so one housing is on top of the other housing (e.g., as illustrated in FIGS. 9 and 10) and the one housing does not extend into the other housing.

In an example, the second housing 106a can include the one or more temperature sensors 110b, the one or more humidity sensors 112b, the heating element 114b, the heating element activation module 116b, the vent opening 118, and an air mover 120b. The air mover 120b can be a fan or some other type of device or component that can move the air inside the enclosure 102b. The first housing 104 can include the vent 108. When the first housing 104 is coupled to the second housing 106 to create the enclosure 102a, the vent opening 118 lines up with the vent 108 to allow air to pass through from the inside of the enclosure 102 to the environment outside of the enclosure 102b. As illustrated in FIG. 2B, one air mover 120b, however, the number of the air movers 120b can vary from what is illustrated in FIG. 2B and depends on design constraints and design choice. For example, a very small enclosure 102b, and thus a very small second housing 106a, could have one air mover 120b or fewer air movers 120b than a very large enclosure with a very large second housing 106a. Also, the location of the air mover 120b can vary from what is illustrated in FIG. 2B and depends on design constraints and design choice. In some examples, the air mover 120b is located near the vent opening 118.

In an example, based on the readings from the one or more temperature sensors 110b and the one or more humidity sensors 112b, the heating element activation module 116b can activate the heating element 114b to heat the air inside the enclosure 102b and can activate the air mover 120b to circulate the air inside the enclosure 102b. More specifically, if temperature of the air inside the enclosure 102b is at or near the dew point, the heating element activation module 116*b* can activate the heating element 114*b* to heat the air inside the enclosure 102*b* above the dew point to help prevent condensation inside the enclosure 102*b* and the air mover 120*b* can be activated to help circulate the warm air inside the enclosure 102*b*. When the heating element 114*b* is activated, the heating element activation module 116*b* can also open the vent 108 to allow warm moist air that is being circulated by the air mover 120*b* to escape the enclosure 102*b*. When the temperature of the air inside the enclosure 102*b* is above the dew point, the heating element activation module 116*b* can de-activate the heating element 114*b* and the air mover 120*b*. In addition, the heating element activation module 116*b* closes the vent 108 to help keep cold moist air from entering the enclosure 102*b*.

In some examples, the first housing 104*a* illustrated in FIG. 2A can be coupled to the second housing 106*a* illustrated in FIG. 2B. The heating element activation module 116*a* in the first housing 104*a* can function independently of the heating element activation module 116*b* in the second housing 106*a*. In other examples, the heating element activation module 116*a* in the first housing 104*a* can control the heating element activation module 116*b* in the second housing 106*a*.

Figure 2C:
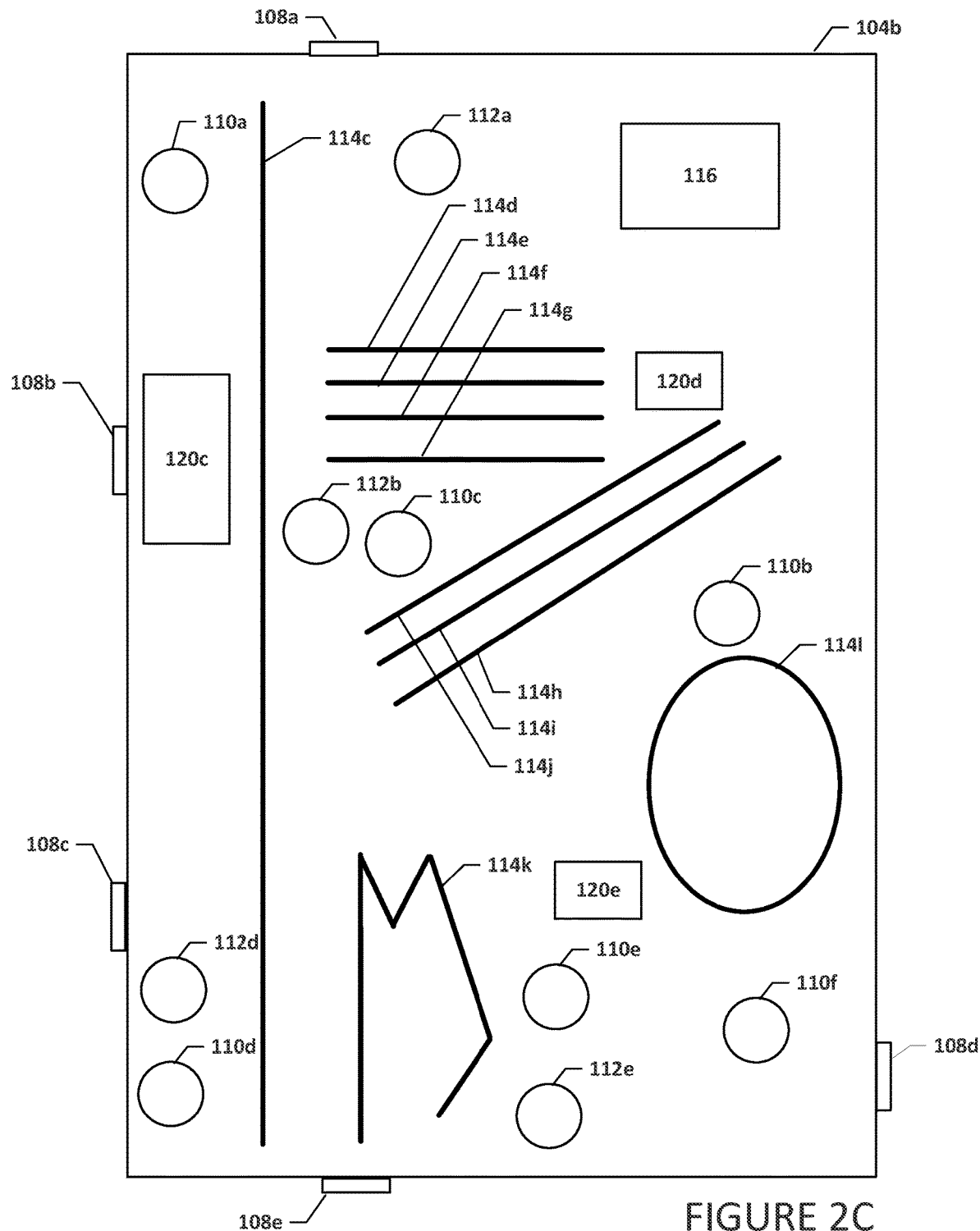

FIG. 2C illustrates a portion of a system help enable active condensation mitigation inside an electronic enclosure according to some embodiments of the present disclosure. In an example, a first housing 104*b* can be secured to a second housing (not shown) to create an enclosure (e.g., similar to the enclosure 102 illustrated in FIG. 1C). It should be noted that while the description below discusses the first housing 104*b*, the discussion below is equally applicable to the second.

The first housing 104*b* can include one or vents 108, one or more temperature sensors 110, one or more humidity sensors 112, one or more heating elements 114, a heating element activation module 116 and one or more air movers 120. For example, as illustrated in FIG. 2, the first housing 104*b* includes six temperature sensors 110*a*-110*f*, five humidity sensors 112*a*-112*e*, ten heating elements 114*c*-114*l*, five vents 108*e*, and three air movers 120*c*-120*e*. The number of the temperature sensors 110, the humidity sensors 112, the heating elements 114, the vents 118, and the air movers 120 can vary from what is illustrated in FIG. 2C and depends on design constraints and design choice. Also, the location of the temperature sensors 110, the humidity sensors 112, the heating elements 114, the vents 118, and the air movers 120 can vary from what is illustrated in FIG. 2C and depends on design constraints and design choice.

The heating elements 114*c*-114*l* can be a conductive material (e.g., a conductive metal wire) embedded into the first housing 104 and when a current is caused to run through the heating elements 114*c*-114*l*, the heating elements 114*c*-114*l* heat up due to resistive heating of the conductive material. The resistive heating, or resistance of, the heating elements 114*c*-114*l* and the amount of current going through the heating elements 114*c*-114*l* can be adjusted depending on design choice and design constraints. For example, to produce a relatively large amount of heat in a relatively short period of time, the heating elements 114*c*-114*l* can have a relatively high resistance and a relatively high current can be passed through the heating elements 114*c*-114*l*.

Each of the heating elements 114*c*-114*l* can be controlled independently, as a group with other heating elements 114*c*-114*l* (e.g., heating elements 114*d*-114*g* are controlled as a first group and heating elements 114*h*-114*j* are controlled as a second group), or all the heating elements 114*c*-114*l* can be controlled together. For example, the heating element 114*l* may be around a critical processor or a central processing unit for the system. If the temperature in the enclosure is below the operating threshold temperature of the critical processor or the central processing unit for the system, the heating element 114*l* can be activated to increase the temperature around the critical processor or the central processing unit for the system without activating the other heating elements 114*c*-114*k*. In addition, if the temperature inside the enclosure is relatively close to the dew point or is a few degrees below the dew point, only a few of the heating elements 114*c*-114*l* may be activated. For example, only the heating elements 114*h*-114*j* may need to be activated to raise the temperature inside the enclosure above the dew point.

Each of the vents 108*a*-108*e* can be controlled independently, as a group (e.g., vents 108*b*-108*c* are controlled as a group), or all the vents 108-108*e* can be controlled together. For example, if the humidity inside the enclosure is relatively high, then all the vents 108*a*-108*e* can be opened to allow a maximum amount of warm moist air to escape the enclosure. If the enclosure is in a specific orientation such as that the vents 108*c*-108*e* are near the bottom of the enclosure, then only vents 108*a* and 108*b* may be open so the warm moist air can rise in the enclosure and escape the enclosure through the open vents 108*a* and 108*b*.

Each of the air movers 120*c*-120*e* controlled independently, as a group (e.g., air movers 120*c* and 120*d* are controlled as a group), or all the air movers 120*c*-120*e* can be controlled together. In an illustrative example, one or more air movers 120 can be located near a vent 108. For example, as illustrated in FIG. 2C, the air mover 120*c* is located near the vent 108*b* such that the outlet of the air mover 120*c* is directed towards the vent 108*b* to push or force air out of the first housing 104*b*. In another illustrative example, one or more air movers 120 can be located near one or more heating elements. For example, as illustrated in FIG. 2C, the air mover 120*d* is located near the heating elements 114*d*-114*j* to help circulate the air heated by the heating elements 114*d*-114*j*.

Figure 3:
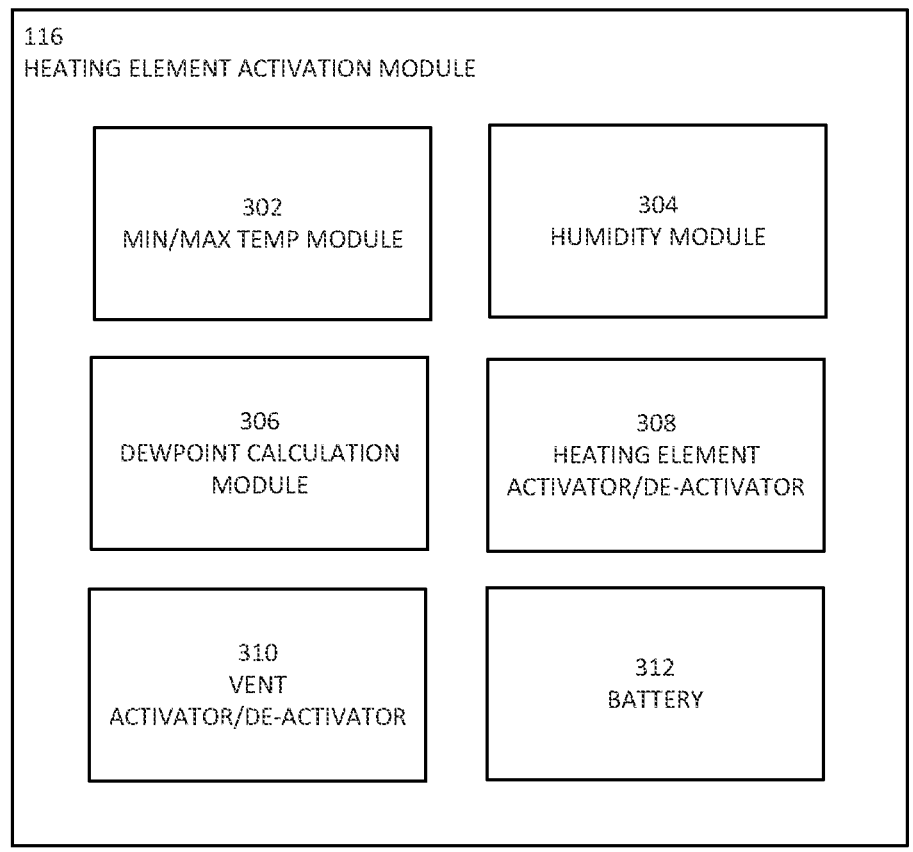
FIG. 3 illustrates a heating element activation module according to some embodiments of the present disclosure.

FIG. 3 illustrates a block diagram of a portion of a heating element activation module 116 to help enable active condensation mitigation inside an electronic enclosure (e.g., enclosure 102), according to some embodiments of the present disclosure. In an example, the heating element activation module 116 can include a minimum and maximum temperature module 302, a humidity module 304, a dewpoint calculation module 306, a heating element activator/de-activator 308, a vent activator/de-activator 310, and a battery 312. The battery 312 can be a separate battery from the battery of a system in the enclosure to allow the heating element activation module 116 to operate before the system is powered on. In case of condensation or if the temperature inside the enclosure is below the operating temperature of electronics in the system, the heating element activation module 116 can power on using the battery 312 without having to power on the system.

The minimum and maximum temperature module 302 can receive temperature readings from one or more temperature sensors (e.g., the temperature sensors 110) in the enclosure and determine a minimum temperature in the enclosure and a maximum temperature in the enclosure. The maximum temperature in the enclosure (along with the humidity in the enclosure) is used by the dewpoint calculation module 306 to determine the dew point for the environment inside the enclosure. The humidity module 304 can receive humidity readings from one or more humidity sensors (e.g., the one or more humidity sensors 112) in the enclosure. The humidity in the enclosure (along with the temperature in the enclosure) is used by the dewpoint calculation module 306 to determine the dew point for the environment inside the enclosure. Also, in some examples, the humidity module 304 can determine if the relative humidity inside the enclosure 102 is above a threshold that can result in condensation in the enclosure. More specifically, if the relative humidity is above forty percent, then there is a risk of condensation in the enclosure.

The dewpoint calculation module 306 uses the maxim temperature reading in the enclosure from the minimum and maximum temperature module 302 and the humidity reading in the enclosure to determine the dew point for the environment in the enclosure. More specifically, the dewpoint calculation module 306 can use the formula Td=Tmax−((100−RH)/5) where Tmax is the maximum temperature reading in the enclosure, RH is the relative humidity in the enclosure, and Td is the dew point temperature. The determined dew point for the environment in the enclosure is compared to the minimum temperate in the enclosure to determine if the minimum temperature in the enclosure is below the dewpoint. If one temperature reading from the temperature sensors is below the determined dew point temperature, the dewpoint calculation module 306 can send a signal to the heating element activator/de-activator 308 to activate one or more of the heating elements (e.g., the heating element 114) in the enclosure to generate heat and raise the temperature in the enclosure to a temperature above the dew point temperature. Also, if one temperature reading from the temperature sensors is below the determined dew point temperature, the dewpoint calculation module 306 can send a signal to the vent activator/de-activator 310 to open one or more of the vents (e.g., the vent 108) to allow the heated moist air to escape the enclosure. The temperature and humidity in the enclosure are continually monitored and when the temperature reading from all of the temperature sensors is above the dew point, the dewpoint calculation module 306 can send a signal to the heating element activator/de-activator 308 to de-activate the heating elements and to the vent activator/de-activator 310 to close the vents.

Figure 4:
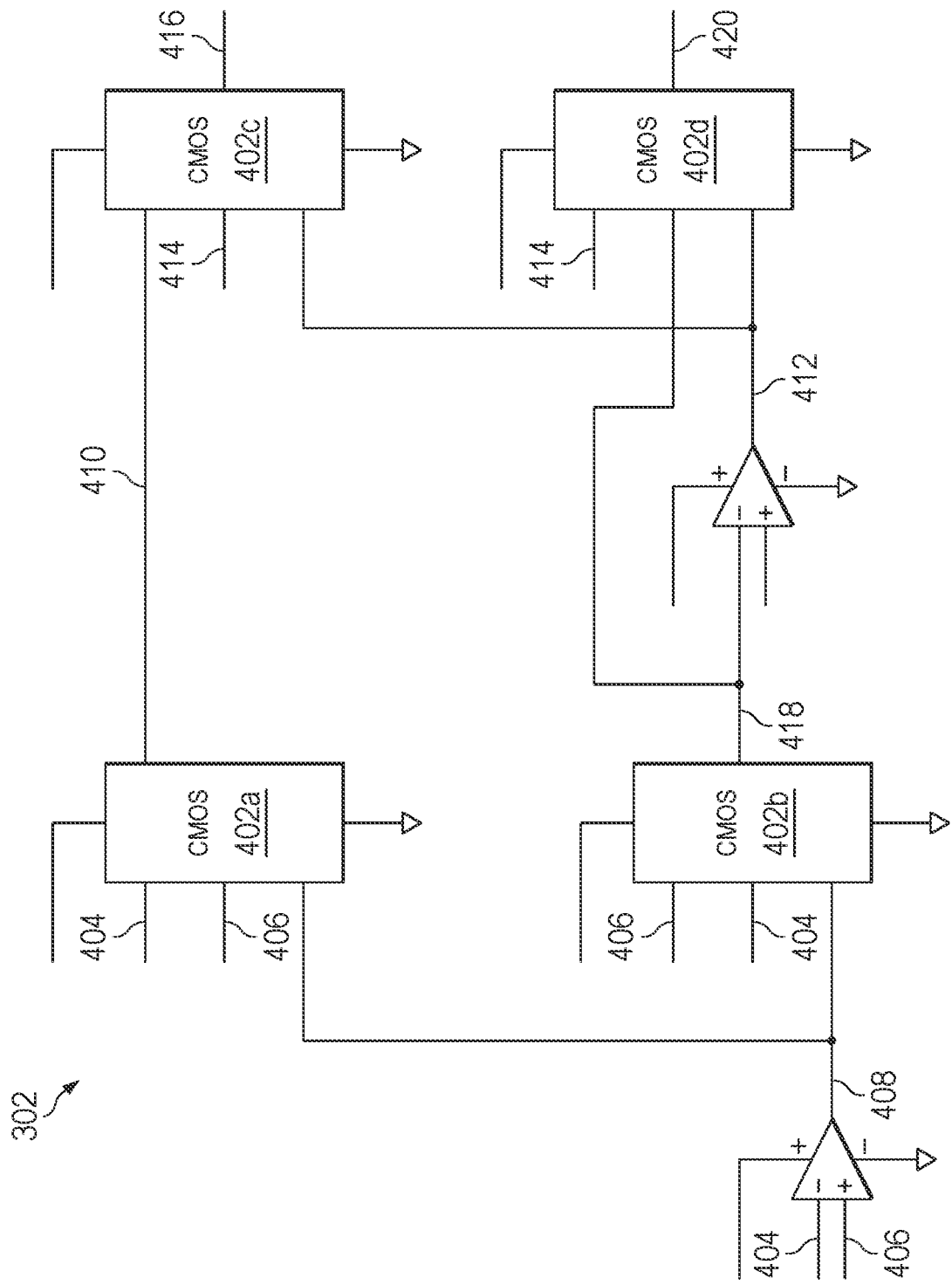
FIG. 4 illustrates an example system summary according to some embodiments of the present disclosure.

FIG. 4 illustrates a block diagram of a portion of the heating element activation module 116 to help enable active condensation mitigation inside an electronic enclosure (e.g., enclosure 102), according to some embodiments of the present disclosure. More specifically, FIG. 4 illustrates a specific implementation of the minimum and maximum temperature module 302. In an example, the minimum and maximum temperature module 302 can receive three temperature readings from three temperature sensors (e.g., the temperature sensors 110). More specifically, a first temperature reading 404 and a second temperature reading 406 can be amplified to create an amplified first and second temperature reading 408. A complementary metal-oxide semiconductor (CMOS) 402a and a CMOS 402b can receive the first temperature treading 404, the second temperature reading 406, and the amplified first and second temperature reading 408. The CMOS 402a can determine the minimum temperature reading between the first temperature reading 404 and the second temperature reading 408 and communicate an intermediate minimum temperature reading 410 to a CMOS 402c. The CMOS 402c can receive the intermediate minimum temperature reading 410 from the CMOS 402a, an amplified third temperature reading 412, and a third temperature reading 414, and output a minimum temperature reading 416 to the dew point calculation module 306.

The CMOS 402b can determine the maximum temperature reading between the first temperature reading and the second temperature reading and communicate the intermediate maximum temperature reading 418 to a CMOS 402d. The CMOS 402d can receive the maximum temperature reading from the CMOS 402b, the amplified third temperature reading 412, and the third temperature reading 414, and output a maximum temperature reading 420 to the dew point calculation module 306. Each of the CMOS devices 402a-402d can be a low voltage CMOS device including two independently selectable single-pole, double-throw (SPDT) switches.

Figure 5:
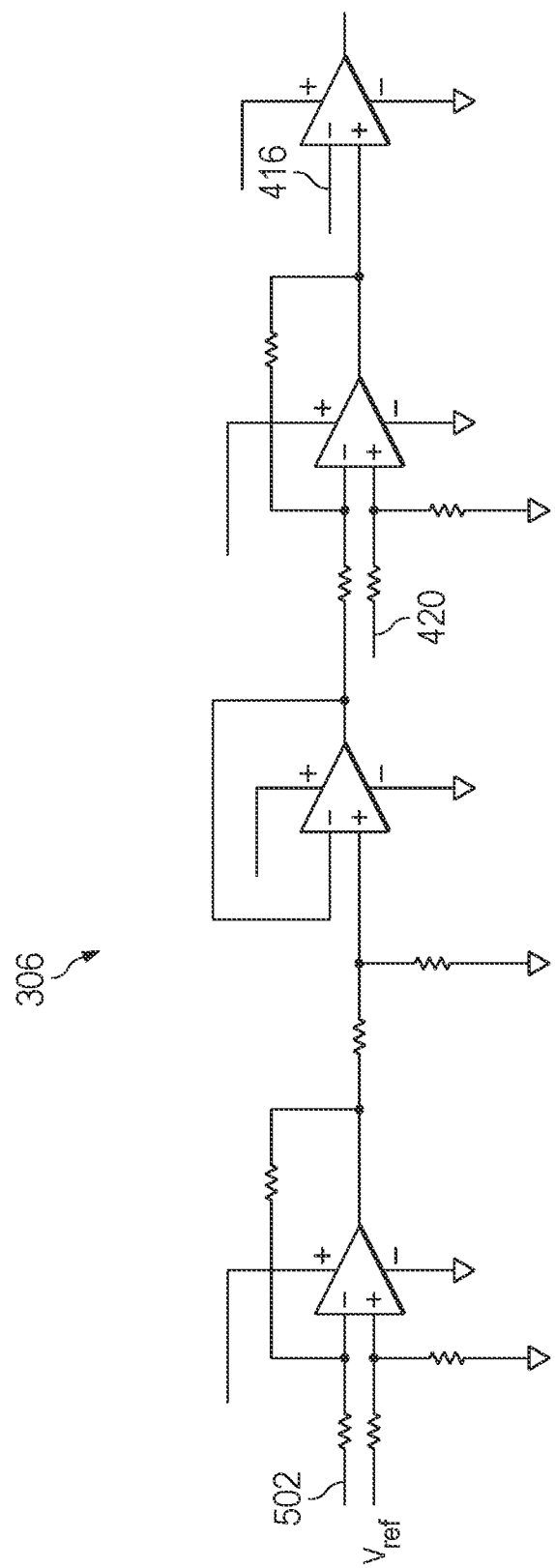
FIG. 5 illustrates an example system summary according to some embodiments of the present disclosure.

FIG. 5 illustrates a block diagram of a portion of the heating element activation module 116 to help enable active condensation mitigation inside an electronic enclosure (e.g., enclosure 102), according to some embodiments of the present disclosure. More specifically, FIG. 5 illustrates a specific implementation of the dew point calculation module 306. The dew point calculation module 306 can receive the humidity sensor reading 502 of the humidity in the enclosure from the humidity module 304 and the maximum temperature reading 420 from the minimum/maximum temperature module 302 and determine the dew point of the environment inside the enclosure. The minimum temperature reading 416 from the minimum/maximum temperature module 302 for in the environment inside the enclosure is then compared to the dew point to determine if the minimum temperature in the enclosure is below the dewpoint. If the minimum temperature is below the dewpoint, then the heating elements are activated to raise the temperature of the environment inside the enclosure to a temperature above the dew point.

Exemplary Process

Figure 6:
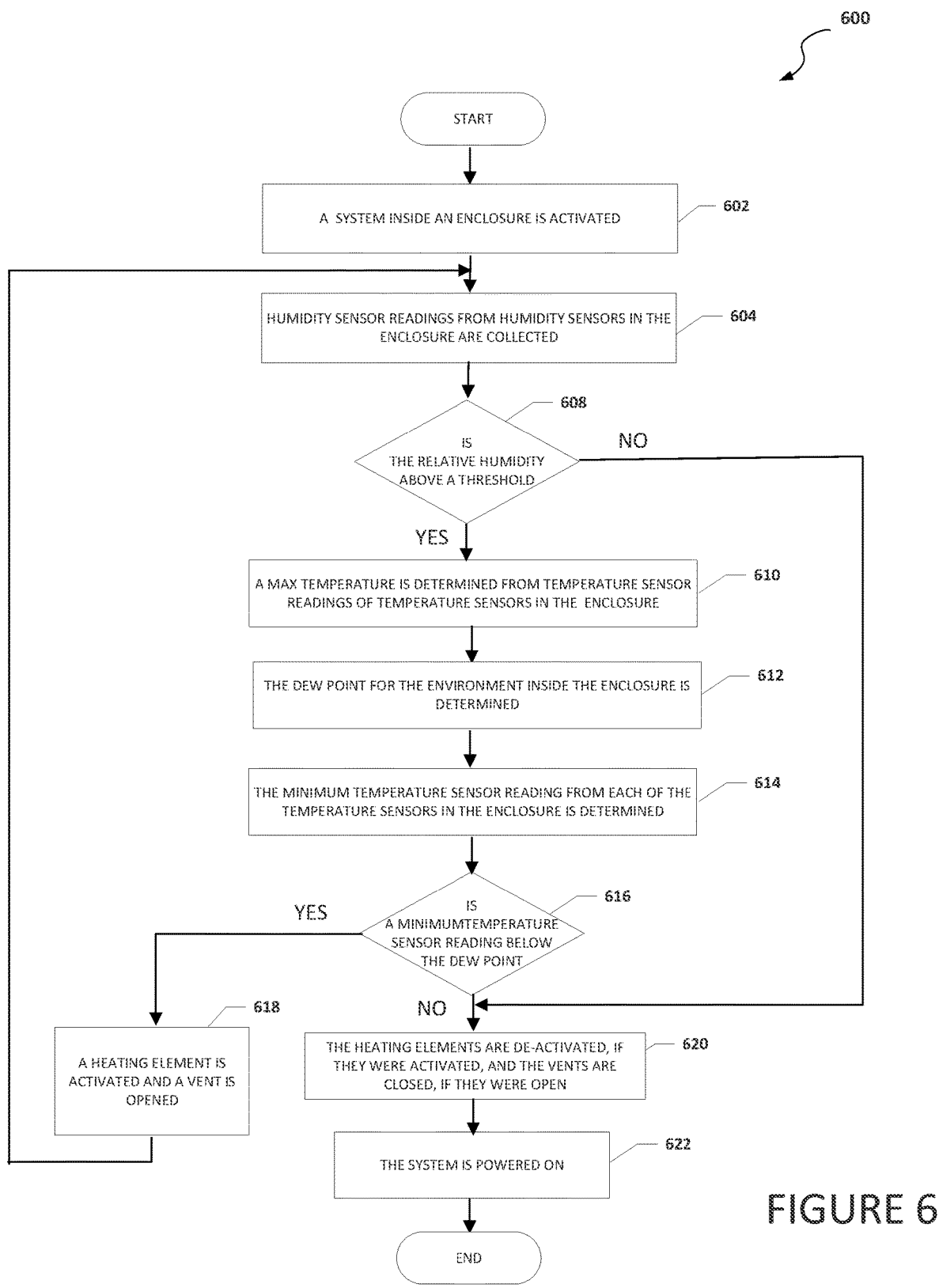
FIG. 6 is a flowchart showing a process for using a system and method to help enable active condensation mitigation inside an electronic enclosure according to some embodiments of the present disclosure.

FIG. 6 is an example flowchart illustrating possible operations of a flow 600 that may be associated with a system and method to help enable active condensation mitigation inside an electronic enclosure, in accordance with an embodiment. In an embodiment, one or more operations of flow 600 may be performed by the minimum and maximum temperature module 302, the humidity module 304, the dewpoint calculation module 306, the heating element activator/de-activator 308, and the vent activator/de-activator 310.

At 602, an electronic system inside an enclosure is activated. For example, an electronic system (e.g., the electronic system 902 illustrated in FIG. 9) can be inside enclosure 102 and the electronic system can be activated. More specifically, the electronic system may be an onboard controller (e.g., the onboard controller 1104 illustrated in FIG. 11) for an autonomous vehicle (AV). At 604, humidity sensor reading from humidity sensors in the enclosure are collected. For example, the humidity module 304 can collect humidity sensor readings from the humidity sensors 112 in the enclosure 102. At 608, the system determines if the relative humidity inside the enclosure is above a threshold. For example, the humidity module 304 can determine if the relative humidity inside the enclosure 102 is above a threshold that can result in condensation in the enclosure. More specifically, if the relative humidity inside the enclosure is above about forty percent, then there is a possible risk of condensation in the enclosure. If the condensation is not above the threshold, then the system can be safely powered on without the risk of condensation in the enclosure.

If the relative humidity in the enclosure is above a threshold, then a maximum temperature reading is determined from the temperature sensor reading of temperature sensors in the enclosure, as in 610. For example, the minimum and maximum temperature module 302 can determine the maximum temperature reading from the temperature sensors 110. At 612, the dew point for the environment inside the enclosure is determined. For example, using the maximum temperature reading from the temperature sensors 110 and the humidity reading from the humidity sensors 112, the dewpoint calculation module 306 can determine the dew point for the environment inside the enclosure 102. At 614, the minimum temperature sensor reading from each of the temperature sensor in the enclosure is determined. For example, the minimum and maximum temperature module 302 can determine the minimum temperature sensor reading from each of the temperature sensors 110. At 616, the system determines if any of the temperature sensor readings from the temperature sensors is below the dew point. For example, the dewpoint calculation module 306 can determine if any of the minimum temperature sensor readings from each of the temperature sensors 110 is below the dewpoint. If any of the minimum temperature sensor reading is below the dew point, a heating element is activated and a vent is opened, as in 618, and the system returns to 604 and again, humidity sensor reading from the humidity sensors in the enclosure are collected. For example, if any of the minimum temperature sensor readings from the temperature sensors 110 are below the dew point, then one or more heating elements 114 are activated to raise the temperature inside the enclosure above the dew point and one or more vents 108 are opened to allow the heat moist air to escape. If any of the minimum temperature sensor reading is not below the dew point (or none of the minimum temperature sensor reading are below the dew point), then the heating elements are de-activated, if they were activated, and the vents are closed, if they were open, as in 620 and the electronic system is powered on, as in 622. For example, if none of the minimum temperature sensor reading from the temperature sensors 110 are below the dew point, then, if any heating elements 114 were activated, the heating elements 114 are de-activated by the heating element activator/de-activator 308 and if any of the vents 108 were open, the vents are closed by the vent activator/de-activator 310. The electronic system can be powered on because the risk of condensation inside the enclosure has been mitigated. Going back to 608, if the relative humidity is not above the threshold, then the heating elements are de-activated, if they were activated, and the vents are closed, if they were open, as in 620 and the electronic system is powered on, as in 622 because the relative humidity, being below the threshold, is not enough to cause condensation inside the enclosure.

Figure 7:
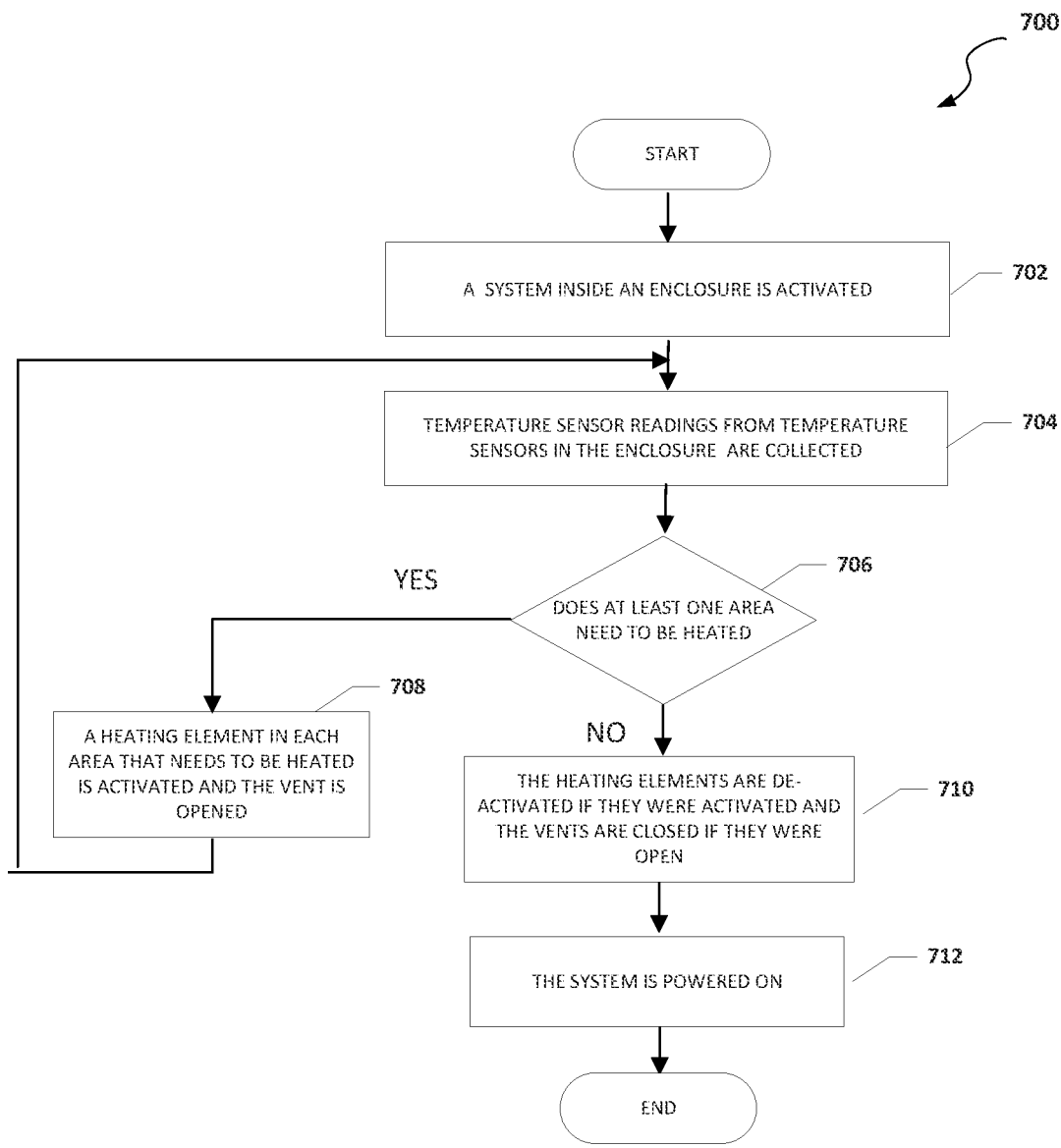
FIG. 7 is a flowchart showing a process for using a system and method to help enable active condensation mitigation inside an electronic enclosure according to some embodiments of the present disclosure.

FIG. 7 is an example flowchart illustrating possible operations of a flow 700 that may be associated with a system and method to help enable active condensation mitigation inside an electronic enclosure, in accordance with an embodiment. In an embodiment, one or more operations of flow 700 may be performed by the minimum and maximum temperature module 302, the humidity module 304, the dewpoint calculation module 306, the heating element activator/de-activator 308, and the vent activator/de-activator 310.

At 702, an electronic system inside an enclosure is activated. For example, an electronic system (e.g., the electronic system 902 illustrated in FIG. 9) can be inside enclosure 102 and the electronic system can be activated. More specifically, the electronic system may be an onboard controller (e.g., the onboard controller 1104 illustrated in FIG. 11) for an autonomous vehicle (AV). At 704, temperature sensor readings from temperature sensors in the enclosure are collected. For example, the temperature sensor readings from the temperature sensors 110 in the enclosure can be collected. At 706, the system determines if at least one area of the enclosure need to be heated. For example, due to the minimum temperature sensor reading from at least one of the temperature sensors 110 being below the dew point, at least one area of the enclosure may need to be heated. In another example, if a temperature sensor reading from at least one of the temperature sensors 110 is below the minimum recommended operating temperature or minimum operating temperature of the electronics inside the enclosure, at least the area around the electronics may need to be heated.

If at least one area of the enclosure needs to be heated, then a heating element in each area that needs to be heated is activated and a vent is opened, as in 708, and again, temperature sensor readings from temperature sensors in the enclosure are collected, as in 704. For example, if any of the minimum temperature sensor readings from the temperature sensors 110 are below the dew point, then one or more heating elements 114 are activated to raise the temperature inside the enclosure above the dew point and one or more vents 108 are opened to allow the heat moist air to escape. In another example, if the temperature sensor readings from the temperature sensors 110 are below the minimum recommended operating temperature or minimum operating temperature of the electronics inside the enclosure, the heating elements 114 near the electronics are activated to raise the temperature inside the enclosure above the minimum recommended operating temperature or minimum operating temperature of the electronics. More specifically, the heating element 1141 illustrated in FIG. 2 can be a specific heating element for a specific electronic device or element (e.g., a central processing unit) and the heating element 1141 can be activated to raise the temperature around the specific electronic device or element above the minimum recommended operating temperature or minimum operating temperature for the specific electronic device or element. If at least one area of the enclosure does not need to be heated, then the heating elements are de-activated, if they were activated, and the vents are closed, if they were open, as in 710 and the electronic system is powered on, as in 712. For example, if none of the minimum temperature sensor reading from the temperature sensors 110 are below the dew point, then, if any heating elements 114 were activated, the heating elements 114 are de-activated by the heating element activator/de-activator 308 and if any of the vents 108 were open, the vents are closed by the vent activator/de-activator 310. The electronic system can be powered on because the risk of condensation inside the enclosure has been mitigated. In another example, if the temperature sensor readings from the temperature sensors 110 are above the minimum recommended operating temperature or minimum operating temperature of the electronics inside the enclosure, then the system can be powered on 712.

Figure 8:
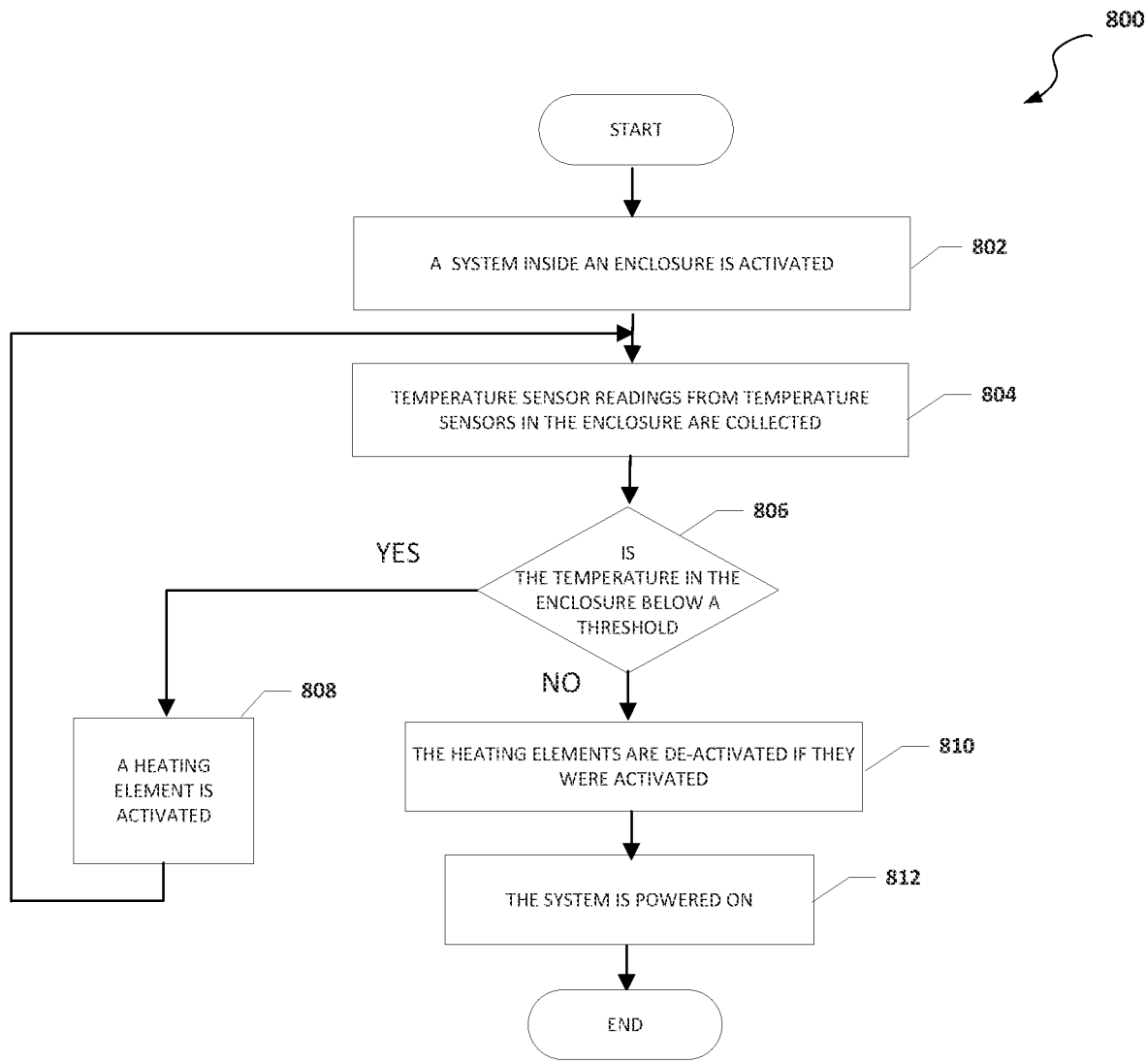
FIG. 8 is a flowchart showing a process for using a system and method to help enable active condensation mitigation inside an electronic enclosure according to some embodiments of the present disclosure.

FIG. 8 is an example flowchart illustrating possible operations of a flow 800 that may be associated with a system and method to help enable active condensation mitigation inside an electronic enclosure, in accordance with an embodiment. In an embodiment, one or more operations of flow 800 may be performed by the minimum and maximum temperature module 302, the humidity module 304, the dewpoint calculation module 306, the heating element activator/de-activator 308, and the vent activator/de-activator 310.

At 802, an electronic system inside an enclosure is activated. For example, an electronic system (e.g., the electronic system 902 illustrated in FIG. 9) can be inside enclosure 102 and the electronic system can be activated.

More specifically, the electronic system may be an onboard controller (e.g., the onboard controller 1104 illustrated in FIG. 11) for an autonomous vehicle (AV). At 804, temperature sensor readings from temperature sensors in the enclosure are collected. For example, the temperature sensor readings from the temperature sensors 110 in the enclosure can be collected. At 806, the system determines if the temperature in the enclosure is below a threshold. For example, the threshold may be a dew point or may be a minimum operating temperature for electronics in the enclosure. If the temperature in the enclosure is below a threshold, then a heating element is activated as in 808 and temperature sensor readings from temperature sensors in the enclosure are again collected, as in 804. In some examples, if the temperature in the enclosure is below the dew point, one or more vents can be opened to allow the warm moist air to escape. In other examples, if the temperature in the enclosure is below the minimum operating temperature for electronics in the enclosure, the vents are not opened to allow the warm air to heat up the enclosure rather than escape from the enclosure through an open vent. If the temperature in the enclosure is not below a threshold, the heating elements are de-activated, if they were activated, as in 810 and the electronic system is powered on, as in 812. For example, if any heating elements 114 were activated, the heating elements 114 are de-activated by the heating element activator/de-activator 308 and the electronic system is allowed to be powered on.

Exemplary System Summary

FIG. 9 illustrates a portion of a system help enable active condensation mitigation inside an electronic enclosure according to some embodiments of the present disclosure. In an example, a first housing 104c can be secured to a second housing 106b to create an enclosure (e.g., similar to the enclosure 102c illustrated in FIG. 10) to house electronic system 902 and a liquid cooled cold plate 904. The electronic system 902 may be an onboard controller (e.g., the onboard controller 1104 illustrated in FIG. 11) for an autonomous vehicle (AV). The liquid cooled cold plate 904 can include an inlet 906, and outlet 908, and one or more securing means 910. The inlet 906 and the outlet can help allow liquid to circulate inside the liquid cooled cold plate 904. The securing means 910 can help to secure the enclosure to a structure after the first housing 104c has been secured to the second housing 106b.

The first housing 104c can include the one or more temperature sensors 110, the one or more humidity sensors 112, the one or more heating elements 114a and the heating element activation module 116. The second housing 106b can include vents 108f and 108g and the one or more heating elements 114b. The heating element activation module 116 can control the vents 108f and 108g and the one or more heating elements 114b in the second housing 106b. In some examples, the second housing 106b can include, one or more temperature sensors (e.g., one or more temperature sensors 110b), one or more humidity sensors (e.g., the one or more humidity sensors 112b), and a second heating element activation module (e.g., heating element activation module 116b) and the second heating element activation module controls the vents 1081 and 108g and the one or more heating elements 114b. The number of the temperature sensors 110, the humidity sensors 112, the heating elements 114, and the vents 118 can vary from what is illustrated in FIG. 9 and depends on design constraints and design choice. Also, the location of the temperature sensors 110, the humidity sensors 112, the heating elements 114, and the vents 118 can vary from what is illustrated in FIG. 9 and depends on design constraints and design choice.

FIG. 10 illustrates a portion of a system help enable active condensation mitigation inside an electronic enclosure according to some embodiments of the present disclosure. In an example, a first housing (not shown) can be secured to a second housing 106c to create an enclosure 102c. The enclosure 102c can include one or more ports 1002 to allow for connectivity (e.g., power, communication and data lines, etc.) to the electronics (e.g., the electronic system 902 illustrated in FIG. 9) inside the enclosure 102c and therefore the enclosure 102c is not a closed enclosure and water vapor can enter the enclosure and become condensation if the dew point is reached inside the enclosure 102c. The enclosure 102c can include the inlet 906, the outlet 908, and the one or more securing means 910 on the liquid cooled cold plate 904 can extend from the enclosure 102c to the environment outside of the enclosure 102c.

Figure 11:
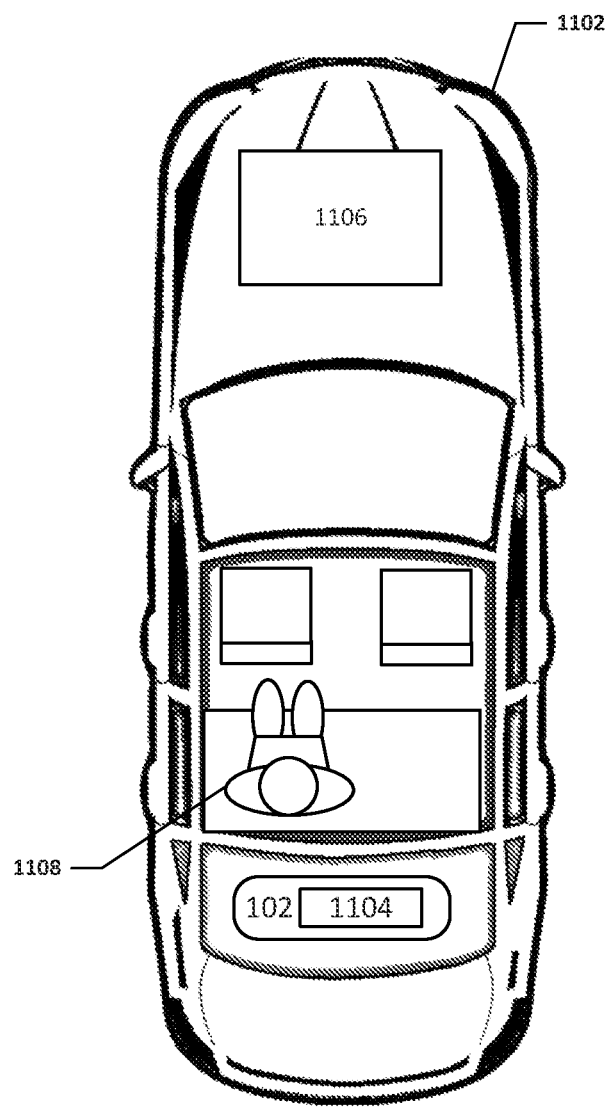
FIG. 11 illustrates an example system summary according to some embodiments of the present disclosure.

FIG. 11 illustrates a portion of a system help enable active condensation mitigation inside an electronic enclosure according to some embodiments of the present disclosure. In an example, the enclosure 102 can be secured to an AV 1102. The enclosure 102 can contain an onboard controller 1104 (described in more detail in FIG. 12) and a sensor suite 1106. In an example, the AV 1102 can be a vehicle used in a ridehail/rideshare service for transporting users 1108 of the ridehail/rideshare service. In other examples, the AV 1102 may be a delivery vehicle. In yet another example, the AV 1102 is both a ridehail/rideshare service vehicle and a delivery vehicle. As illustrated in FIG. 11, the enclosure 102 can be secured to the back of the seat of the AV 1102, behind the user 1108. However, the enclosure 102 can be secured to other parts or areas of the AV 1102, depending on design choice and design constraints.

The AV 1102 is a vehicle that is capable of sensing and navigating its environment with little or no user input. The AV 1102 may be a semi-autonomous or fully autonomous vehicle (e.g., a boat, an unmanned aerial vehicle, a driverless car, etc.). Additionally, or alternatively, the AV 1102 may be a vehicle that switches between a semi-autonomous state and a fully autonomous state and thus, the AV may have attributes of both a semi-autonomous vehicle and a fully autonomous vehicle depending on the state of the vehicle. The AV 1102 may include a throttle interface that controls an engine throttle, motor speed (e.g., rotational speed of electric motor), or any other movement-enabling mechanism, a brake interface that controls brakes of the AV (or any other movement-retarding mechanism), and a steering interface that controls steering of the AV (e.g., by changing the angle of wheels of the AV). The AV 1102 may additionally or alternatively include interfaces for control of other vehicle functions (e.g., windshield wipers, headlights, turn indicators, air conditioning, etc.).

The onboard controller 1104 controls operations and functionality of the AV 1102. In some embodiments, the onboard controller 1104 is a general-purpose computer, but may additionally or alternatively be any suitable computing device. The onboard controller 1104 is adapted for input/output (I/O) communication with other components of the AV 1102 (e.g., the sensor suite 1106, an UI module of the AV, etc.) and external systems (e.g., the fleet management system 1302 illustrated in FIG. 13). The onboard controller 1104 may be connected to the Internet via a wireless connection (e.g., via a cellular data connection). Additionally, or alternatively, the onboard controller 1104 may be coupled to any number of wireless or wired communication systems.

The onboard controller 1104 processes sensor data generated by the sensor suite 1106 and/or other data (e.g., data received from the fleet management system 1302, etc.) to determine the state of the AV 1102. Based upon the vehicle state and programmed instructions, the onboard controller 1104 modifies or controls behavior of the AV 1102. In some embodiments, the onboard controller 1104 implements an autonomous driving system (ADS) for controlling the AV 1102 and processing sensor data from the sensor suite 1106 and/or other sensors in order to determine the state of the AV 1102. Based upon the vehicle state and programmed instructions, the onboard controller 1104 modifies or controls driving behavior of the AV 1102.

The sensor suite 1106 can include a computer vision ("CV") system, localization sensors, and driving sensors. For example, the sensor suite 1106 may include interior and exterior cameras, radar sensors, sonar sensors, light detection and ranging (LIDAR) sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 1102. For example, the AV 1102 may have multiple cameras located at different positions around the exterior and/or interior of the AV 1102.

The AV 1102 may also include a rechargeable battery that powers the AV 1102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 1102 is a hybrid electric vehicle that also includes an internal combustion engine for powering the AV 1102 (e.g., when the battery has low charge). In some embodiments, the AV 1102 includes multiple batteries. For example, the AV 1102 can include a first battery used to power vehicle propulsion, and a second battery used to power the onboard controller 1104 and/or AV hardware (e.g., the sensor suite 1106 and the onboard controller 1104). The AV 1102 may further include components for charging the battery (e.g., a charge port configured to make an electrical connection between the battery and a charging station).

Exemplary Onboard Controller

Figure 12:
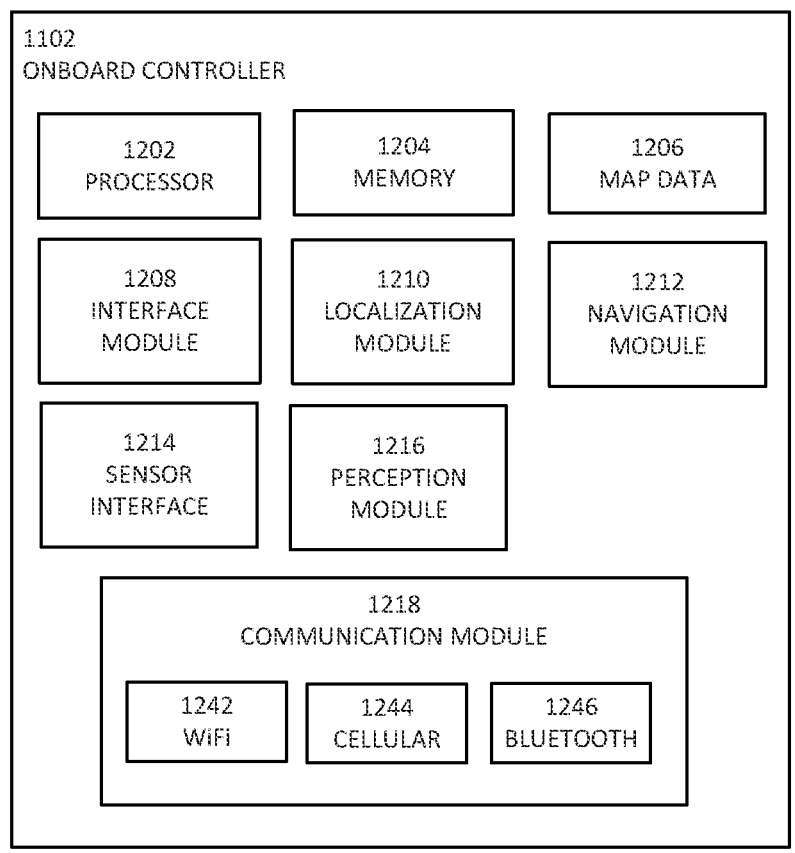
FIG. 12 illustrates an onboard controller of an autonomous vehicle according to some embodiments of the present disclosure.

FIG. 12 is a block diagram illustrating the onboard controller 1104 according to some embodiments of the present disclosure. The onboard controller 1104 includes one or more processors 1202, memory 1204, map data 1206, an interface module 1208, a localization module 1210, a navigation module 1212, a sensor interface 1214, a perception module 1216, and a communication module 1218. The communication module 1218 includes a WiFi communication module 1242, a cellular communication module 1244, and a Bluetooth™ communication module 1246. In some examples, the communication module 1218 can include other specific communication modules that can be used to facilitate communications with the AV 1102 (e.g., a near field communication (NFC) module).

Alternative configurations, different or additional components may be included in the onboard controller 1104. Further, functionality attributed to one component of the onboard controller 1104 may be accomplished by a different component included in the AV 1102 or a different system (e.g., fleet management system 1302). For example, components and modules for conducting route planning, controlling movements of the AV 1102, and other vehicle functions are not shown in FIG. 3.

The map data 1206 stores a detailed map that includes a current environment around the AV 1102. The map data 1206 can be used by the AV 1102 to navigate the AV 1102. The map data 1206 may include any of the map data 1408 described in relation to FIG. 14. In some embodiments, the map data 1206 stores a subset of the map data 1408, (e.g., map data for a city or region in which the AV 1102 is located).

The interface module 1208 facilitates bi-directional wired and wireless communications of the onboard controller 1104 with other systems. For example, the interface module 1208 supports communications of the onboard controller 1104 with other systems (e.g., the fleet management system 1302). The interface module 1208 supports communications of the onboard controller 1104 with other components of the AV 1102. For example, the interface module 142 may retrieve sensor data generated by the sensor suite 1106. The interface module 1208 can communicate with the communication module 1218 to help facilitate communications of the AV 1102.

The localization module 1210 localizes the AV 1102. The localization module 1210 may use sensor data generated by the sensor suite 1106 to determine the current location of the AV 1102. The sensor data includes information describing an absolute or relative position of the AV 1102 (e.g., data generated by GPS, global navigation satellite system (GNSS), IMU, etc.), information describing features surrounding the AV 1102 (e.g., data generated by a camera, RADAR, SONAR, LIDAR, etc.), information describing motion of the AV 1102 (e.g., data generated by the motion sensor), or some combination thereof. In some embodiments, the localization module 1210 uses the sensor data to determine whether the AV 1102 has entered a local area, such as a parking garage or parking lot where the AV 1102 can be charged. In some other embodiments, the localization module 1210 may send the sensor data to the fleet management system 1302 and receive from the fleet management system 1302 a determination whether the AV 1102 has entered the local area.

In some embodiments, the localization module 1210 determines whether the AV 1102 is at a predetermined location (e.g., a destination of a ridehail/rideshare service). For example, the localization module 1210 uses sensor data generated by the sensor suite 1106 to determine the location of the AV 1102. The localization module 1210 may further compare the location of the AV 1102 with the predetermined location to determine whether the AV 1102 has arrived at a destination. The localization module 1210 may provide locations of the AV 1102 to the fleet management system 1302.

The localization module 1210 can further localize the AV 1102 within the local area. For example, the localization module 1210 determines a pose (position or orientation) of the AV 1102 in the local area. In some embodiments, the localization module 1210 localizes the AV 1102 within the local area by using a model of the local area. The model may be a 2D or 3D representation of the surrounding area, such as a map or a 3D virtual scene simulating the surrounding area. In various embodiments, the localization module 1210 receives the model of the local area from the fleet management system 1302. The localization module 1210 may send a request for the model to the fleet management system 1302 and in response, receive the model of the local area. In some embodiments, the localization module 1210 generates the request based on sensor data indicating a position or motion of the AV 1102. For example, the localization module 1210 detects that the AV 1102 is in the local area or is navigated to enter the local area based on the sensor data and sends out the request in response to such detection. This process can be dynamic. For example, the localization module 1210 may send new request to the fleet management system 2102 as the AV 1102 changes its position.

The localization module 1210 may further localize the AV 1102 with respect to an object in the local area. An example of the object is a building in the local area. The localization module 1210 may determine a pose of the AV 1102 relative to the building based on features in the local area. For example, the localization module 1210 retrieves sensor data from one or more sensors (e.g., camera, LIDAR, etc.) in the sensor suite 1106 that detect the features in the environment of the AV 1102. The localization module 1210 uses the sensor data to determine the pose of the AV 1102. The features may be lane markers, street curbs, driveways, and so on. A feature may be two-dimensional or three-dimensional.

The navigation module 1212 controls motion of the AV 1102. The navigation module 1212 may control the motor of the AV 1102 to start, pause, resume, or stop motion of the AV 1102. The navigation module 1212 may further control the wheels of the AV 1102 to control the direction the AV 1102 will move.

In various embodiments, the navigation module 1212 generates a navigation route for the AV 1102 based on a location of the AV 1102, a destination, and a map. The navigation module 1212 may receive the location of the AV 1102 from the localization module 1210. The navigation module 1212 receives a request to go to a location and, using map data 1206, generates a route to navigate the AV 1102 from its current location, which is determined by the localization module 1210, to the location. The navigation module 1212 may receive the destination from the fleet management system 1302, through the interface module 1208. In some examples, the navigation module 1212 generates a navigation route for the disabled AV 1102b based on a location of the AV 1102 and/or the disabled AV 1102b, a destination, and a map (e.g., from the map data 1206).

The sensor interface 1214 interfaces with the sensors in the sensor suite 1106. The sensor interface 1214 may request data from the sensor suite 1106 (e.g., by requesting that a sensor capture data in a particular direction or at a particular time). The sensor interface 1214 is configured to receive data captured by sensors of the sensor suite 1106. The sensor interface 1214 may have subcomponents for interfacing with individual sensors or groups of sensors of the sensor suite 1106, such as a camera interface, a LIDAR interface, a radar interface, a microphone interface, etc.

The perception module 1216 identifies objects and/or other features captured by the sensor suite 1106 of the AV 1102. For example, the perception module 1216 identifies objects in the environment of the AV 1102 and captured by one or more sensors of the sensor suite 1106. The perception module 1216 may include one or more classifiers trained using machine learning to identify particular objects. For example, a multi-class classifier may be used to classify each object in the environment of the AV 1102 as one of a set of potential objects, (e.g., a vehicle, a pedestrian, or a cyclist). As another example, a pedestrian classifier recognizes pedestrians in the environment of the AV 1102, a vehicle classifier recognizes vehicles in the environment of the AV 1102, etc. The perception module 1216 may identify travel speeds of identified objects based on data from a radar sensor, (e.g., speeds at which other vehicles, pedestrians, or birds are traveling). As another example, the perception module 1216 may identify distances to identified objects based on data (e.g., a captured point cloud) from a LIDAR sensor, (e.g., a distance to a particular vehicle, building, or other feature identified by the perception module 1216). The perception module 1216 may also identify other features or characteristics of objects in the environment of the AV 1102 based on image data or other sensor data, for example, colors (e.g., the color of a specific building or house), sizes (e.g., heights of people or buildings in the environment), makes and models of vehicles, pictures and/or words on billboards, etc.

In some embodiments, the perception module 1216 fuses data from one or more sensors in the sensor suite 1106 of the AV 1102 and/or map data 1206 to identify environmental features around the AV 1102. While a single perception module 1216 is shown in FIG. 11, in some embodiments, the onboard controller 1104 may have multiple perception modules (e.g., different perception modules for performing different ones of the perception tasks described above (e.g., object perception, speed perception, distance perception, feature perception, facial recognition, mood determination, sound analysis, gaze determination, etc.).

Exemplary Autonomous Vehicle System

Figure 13:
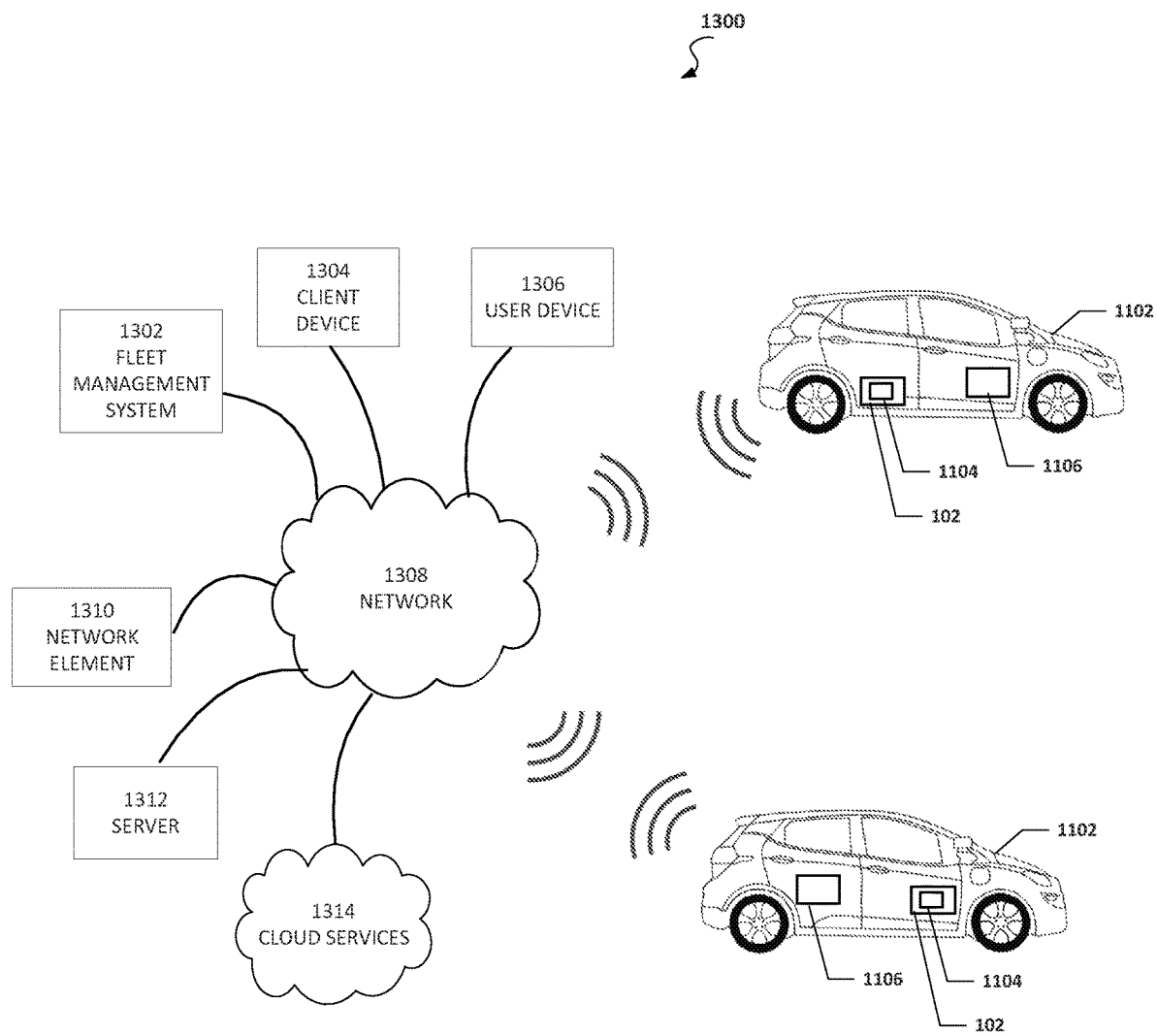
FIG. 13 shows an autonomous vehicle environment according to some embodiments of the present disclosure.

FIG. 13 shows an AV environment 1300 according to some embodiments of the present disclosure. The AV environment 1300 can include AVs 1102, a fleet management system 1302, a client device 1304, and a user device 1306. Each of the AVs 1102 can include the onboard controller 1104 and the sensor suite 1106. The onboard controller is housed in the enclosure 102. The onboard controller 1104 controls the AV 1102 and helps facilitate communication with the AV 1102. The sensor suite 1106 detects the environment inside and outside of the AV 1102 and generates sensor data describing the surround environment.

Each of the AVs 1102, the fleet management system 1302, the client device 1304, and/or the user device 1306 can be in communication using network 1308. In addition, each of the AVs 1102, the fleet management system 1302, the client device 1304, and/or the user device 1306 can be in communication with one or more network elements 1310, one or more servers 1312, and cloud services 1314 using the network 1308. In other embodiments, the AV environment 1300 may include fewer, more, or different components. For example, the AV environment 1300 may include a different number of AVs 1102 with some AVs 1102 including the onboard controller 1104 and some AVs 1102 not including the onboard controller 1104 (not shown). A single AV is referred to herein as AV 1102, and multiple AVs are referred to collectively as AVs 1102. For purpose of simplicity and illustration, FIG. 13 shows one client device 1304 and one user device 1306. In other embodiments, the AV environment 1300 includes multiple third-party devices or multiple client devices.

In some embodiments, the AV environment 1300 includes one or more communication networks (e.g., network 1308) that supports communications between some or all of the components in the AV environment 1300. The network 1308 may comprise any combination of local area and/or wide area networks, using both wired and/or wireless communication systems. In one embodiment, the network uses standard communications technologies and/or protocols. For example, the network 1308 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1308 may be represented using any suitable format, such as hypertext markup language (HTML) or extensible markup language (XML). In some embodiments, all or some of the communication links of the network 1308 may be encrypted using any suitable technique or techniques.

In some embodiments, an AV 1102 includes the onboard controller 1104 (illustrated in FIG. 12) and the sensor suite 1106. The sensor suite 1106 can include a computer vision ("CV") system, localization sensors, and driving sensors. For example, the sensor suite 1106 may include interior and exterior cameras, radar sensors, sonar sensors, light detection and ranging (LIDAR) sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 1102. For example, the AV 1102 may have multiple cameras located at different positions around the exterior and/or interior of the AV 1102.

An AV 1102 may also include a rechargeable battery that powers the AV 1102. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 1102 is a hybrid electric vehicle that also includes an internal combustion engine for powering the AV 1102 (e.g., when the battery has low charge). In some embodiments, the AV 1102 includes multiple batteries. For example, the AV 1102 can include a first battery used to power vehicle propulsion, and a second battery used to power the onboard controller 1104 and/or AV hardware (e.g., the sensor suite 1106 and the onboard controller 1104). The AV 1102 may further include components for charging the battery (e.g., a charge port configured to make an electrical connection between the battery and a charging station).

The fleet management system 1302 manages ridehail/rideshare services using the AVs 1102. Generally, a ridehail/rideshare service is a service where users are picked up and dropped off in a vehicle (AV 1102). The ridehail/rideshare service is typically arranged using a website or app.

The fleet management system 1302 may select an AV 1102 from a fleet of AVs 1102 to perform a particular ridehail, rideshare, and/or other tasks and instruct the selected AV 1102 to autonomously drive to a particular location (e.g., an address to pick up a user). The fleet management system 1302 sends a ridehail/rideshare request to the AV 1102. The ridehail/rideshare request includes information associate with the ridehail/rideshare service, information of a user requesting the ridehail/rideshare (e.g., location, identifying information, etc.), information of a user to be picked up, etc. In some embodiments, the fleet management system 1302 may instruct one single AV 1102 to perform multiple ridehail/rideshare services. For example, the fleet management system 1302 instructs the AV 1102 to pick up riders and/or items from one location and deliver the riders and/or items to multiple locations, or vice versa. The fleet management system 1302 also manages maintenance tasks, such as charging and servicing of the AVs 1102. As shown in FIG. 13, each of the AVs 1102 communicates with the fleet management system 1302. The AVs 1102 and fleet management system 1302 may connect over a public network, such as the Internet. The fleet management system 1302 is described further in relation to FIG. 14.

In some embodiments, the fleet management system 1302 may also provide the AV 1102 (and particularly, onboard controller 1104) with system backend functions. The fleet management system 1302 may include one or more switches, servers, databases, live advisors, or an automated voice response system (VRS). The fleet management system 1302 may include any or all of the aforementioned components, which may be coupled to one another via a wired or wireless local area network (LAN). The fleet management system 1302 may receive and transmit data via one or more appropriate devices and network from and to the AV 1102, such as by wireless systems, such as 882.11x, general packet radio service (GPRS), and the like. A database at the fleet management system 1302 can store account information such as subscriber authentication information, vehicle identifiers, profile records, behavioral patterns, and other pertinent subscriber information. The fleet management system 1302 may also include a database of roads, routes, locations, etc. permitted for use by AV 1102. The fleet management system 1302 may communicate with the AV 1102 to provide route guidance in response to a request received from the vehicle.

For example, based upon information stored in a mapping system of the fleet management system 1302, the fleet management system 1302 may determine the conditions of various roads or portions thereof. Autonomous vehicles, such as the AV 1102, may, in the course of determining a navigation route, receive instructions from the fleet management system 1302 regarding which roads or portions thereof, if any, are appropriate for use under certain circumstances, as described herein. Such instructions may be based in part on information received from the AV 1102 or other autonomous vehicles regarding road conditions. Accordingly, the fleet management system 1302 may receive information regarding the roads/routes generally in real-time from one or more vehicles.

The fleet management system 1302 communicates with the client device 1304. For example, the fleet management system 1302 receives ridehail/rideshare requests from the client device 1304. The ridehail/rideshare request may include information of the user to be picked up, information of one or more items to be picked up, information of the location for the pick up (e.g., store location, distribution center location, warehouse location, location of a customer, etc.), and so on. The fleet management system 1302 can provide information associated with the ridehail/rideshare request (e.g., information related to the identity of the user to be picked up, information of the status of the ridehail/rideshare process, etc.) to the client device 1304.

The client device 1304 may be a device (e.g., a computer system) of a user of the fleet management system 1302. The user may be an entity or an individual. In some embodiments, a user may be a customer of another user. In an embodiment, the client device 1304 is an online system maintained by a business (e.g., a retail business, a ridehail/rideshare business, a package service business, etc.). The client device 1304 may be an application provider communicating information describing applications for execution by the user device 1306 or communicating data to the user device 1306 for use by an application executing on the user device 1306.

The user device 1306 is one or more computing devices capable of receiving user input as well as transmitting and/or receiving data via the network. The user device 1306 may be a device of an individual. The user device 1306 communicates with the client device 1304 to request use of the AV 1102. For example, the user device 1306 may send a ridehail request or user pick up request to the client device 1304 through an application executed on the user device 1306. The user device 1306 may receive from the client device 1304 information associated with the request, such as the identity of the user to be picked up, a status of a ridehail/ rideshare process, etc. In one embodiment, the user device 1306 is a conventional computer system, such as a desktop or a laptop computer. Alternatively, a user device 1306 may be a device having computer functionality, such as a personal digital assistant (PDA), a mobile telephone, a smartphone, or another suitable device. A user device 1306 is configured to communicate via the network. In one embodiment, a user device 1306 executes an application allowing a user of the user device 1306 to interact with the fleet management system 1302. For example, a user device 1306 executes a browser application to enable interaction between the user device 1306 and the fleet management system 1302 via the network. In another embodiment, a user device 1306 interacts with the fleet management system 1302 through an application programming interface (API) running on a native operating system of the user device 1306, such as IOS® or ANDROID™

Exemplary Online System

Figure 14:
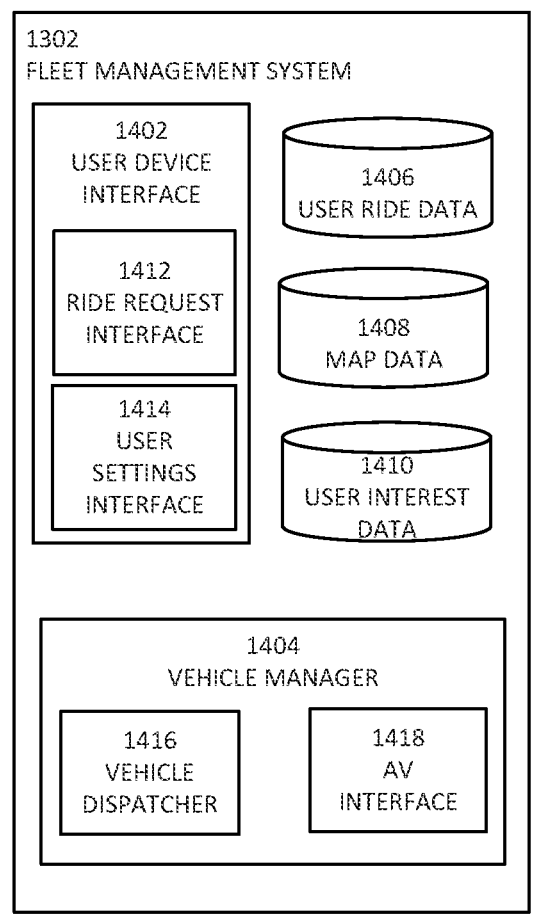
FIG. 14 is a block diagram illustrating a fleet management system according to some embodiments of the present disclosure.

FIG. 14 is a block diagram illustrating the fleet management system 1302 according to some embodiments of the present disclosure. The fleet management system 1302 can include a user device interface 1402, a vehicle manager 1404, user ride data 1406, map data 1408, and user interest data 1410. Each of the user ride data 1406, the map data 1408, and the user interest data 1410 can be located in one or more data stores. In some examples, the one or more datastores are one or more databases. The user device interface 1402 includes a ride request interface 1412 and user settings interface 1414. The vehicle manager 1404 includes a vehicle dispatcher 1416 and an AV interface 1418. Alternative configurations, different or additional components may be included in the fleet management system 1302. Further, functionality attributed to one component of the fleet management system 1302 may be accomplished by a different component included in the fleet management system 1302 or a different system (e.g., the onboard controller of an AV 1102).

The user device interface 1402 is configured to communicate with third-party devices (e.g., the user device 1306) that provide a UI to users. For example, the user device interface 1402 may be a web server that provides a browser-based application to third-party devices, or the user device interface 1402 may be a mobile app server that interfaces with a mobile app installed on third-party devices. For example, the user device interface 1402 may provide one or more apps or browser-based interfaces that can be accessed by users, such as the users using user device 1306. The user device interface 1402 includes the ride request interface 1412, that enables the users to submit requests to a ride service provided or enabled by the fleet management system 1302. The user device interface 1402 further includes the user settings interface 1414 that the user can use to select ride settings. The user settings interface 1414 may enable the user to opt-in to some, all, or none of the options offered by the ride service provider. The user settings interface 1414 may further enable the user to opt-in to certain user device resource usage features (e.g., to opt-in to allow the AV to access the camera on the user device to obtain supplemental image data). The user settings interface 1414 may explain how this data is used and may enable users to selectively opt-in to certain user device resource usage features, or to opt-out of all of the user device resource usage features.

The user ride data 1406 stores ride information associated with users of the ride service. The user ride data 1406 may include an origin location and a destination location for a user's current ride. The map data 1408 stores a detailed map of environments through which the AVs 1102 may travel. The map data 1408 includes data describing roadways, (e.g., locations of roadways, connections between roadways, roadway names, speed limits, traffic flow regulations, toll information, etc.). The user interest data 1410 stores data indicating user interests. For example, a learning module may compare locations in the user ride data 1406 with map data 1408 to identify places the user has visited or plans to visit.

The vehicle manager 1404 manages and communicates with a fleet of AVs (e.g., the AVs 1102). The vehicle manager 1404 may assign AVs 1102 to various tasks and direct the movements of the AVs 1102 in the fleet. The vehicle manager 1404 includes the vehicle dispatcher 1416 and the AV interface 1418. The vehicle dispatcher 1416 selects AVs from the fleet to perform various tasks and instructs the AVs to perform the tasks. For example, the vehicle dispatcher 1416 receives a ride request from the ride request interface 1412. The vehicle dispatcher 1416 selects an AV 1102 to service the ride request based on the information provided in the ride request, (e.g., the origin and destination locations).

The AV interface 1418 interfaces with the AVs 1102, and in particular, with the onboard controller 1104 of the AVs 1102. The AV interface 1418 allows for bi-directional wireless communication between the fleet management system 1302 and AVs 1102. The AV interface 1418 may receive sensor data from the AVs 1102, such as camera images, captured sound, and other outputs from the sensor suite 1106.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of the embodiment, examples, and/or operations disclosed herein may be implemented using one or more electrical circuits on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurations (e.g., programmable) elements arranged in a structure that supports these functions. The software or firmware providing the emulation may be provided on non-transitory computer-readable storage medium comprising instructions to allow a processor to carry out those functionalities.

Additionally, one or more of the AV 1102, the onboard controller 1104, the sensor suite 1106, the fleet management system 1302, and the user device 1306 may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an application specific integrated circuit (ASIC) that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Each of the AV 1102, the onboard controller 1104, the sensor suite 1106, the fleet management system 1302, and the user device 1306 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Each of the AV 1102, the onboard controller 1104, the sensor suite 1106, the fleet management system 1302, and the user device 1306 can include memory elements for storing information to be used in the operations outlined herein. The AV 1102, the onboard controller 1104, the sensor suite 1106, the fleet management system 1302, and the user device 1306 may keep information in any suitable memory element (e.g., random access memory (RAM), read-only memory (ROM), erasable programmable ROM (EPROM), electrically erasable programmable ROM (EEPROM), ASIC, etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in the AV 1102, the onboard controller 1104, the sensor suite 1106, the fleet management system 1302, and the user device 1306 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these examples, memory elements can store data used for the operations described herein. This includes the memory elements being able to store software, logic, code, or processor instructions that are executed to carry out the activities described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

EXAMPLES

Example A1, is an enclosure for an electronic system, the enclosure including a first housing and a second housing. The first housing includes at least one first housing temperature sensor, at least one first housing humidity sensor, at least one first housing heating element, and a heating element activation module to control activation and de-activation of the at least one first housing heating element. The second housing includes at least one second housing temperature sensor, at least one second housing humidity sensor, and at least one second housing heating element, wherein the first housing is coupled to the second housing to create the enclosure for the electronic system and the heating element activation module controls activation and de-activation of the at least one second housing heating element.

In Example A2, the subject matter of Example A1 can optionally include where the first housing and/or the second housing includes one or more vents and the heating element activation module controls opening and closing of each of the one or more vents.

In Example A3, the subject matter of Example A1 can optionally include a plurality of first housing heating elements, wherein the heating element activation module independently controls activation and de-activation of each one of the plurality of first housing heating elements.

In Example A4, the subject matter of Example A1 can optionally include a battery separate from a battery of the electronic system, wherein the heating element activation module is discrete and separate from the electronic system.

In Example A5, the subject matter of Example A1 can optionally include where the at least one first housing heating element and/or the at least one second housing heating element are activated when a temperature in the enclosure is near or below a dew point.

In Example A6, the subject matter of Example A1 can optionally include where the at least one first housing heating element and/or the at least one second housing heating element are activated when a temperature in the enclosure is near or below a minimum operating temperature of the electronic system.

In Example A7, the subject matter of Example A1 can optionally include where the at least one first housing heating element and the at least one second housing heating element are metal wires.

In Example A8, the subject matter of Example A1 can optionally include where at least one first housing heating element is embedded into the first housing and the at least one second housing heating element is embedded into the second housing.

In Example A9, the subject matter of Example A1 can optionally include where the electronic system includes a liquid cooled cold plate.

In Example A10, the subject matter of Example A1 can optionally include where the electronic system is an onboard controller for a vehicle.

In Example A11, the subject matter of Example A10 can optionally include where the vehicle is an autonomous vehicle.

In Example A12, the subject matter of Example A10 can optionally include where the enclosure is located behind a seat of the vehicle.

In Example A13, the subject matter of any of Examples A1-A2 can optionally include a plurality of first housing heating elements, wherein the heating element activation module independently controls activation and de-activation of each one of the plurality of first housing heating elements.

In Example A14, the subject matter of any of Examples A1-A3 can optionally include a battery separate from a battery of the electronic system, wherein the heating element activation module is discrete and separate from the electronic system.

In Example A15, the subject matter of any of Examples A1-A4 can optionally include where the at least one first housing heating element and/or the at least one second housing heating element are activated when a temperature in the enclosure is near or below a dew point.

In Example A16, the subject matter of any of Examples A1-A5 can optionally include where the at least one first housing heating element and/or the at least one second housing heating element are activated when a temperature in the enclosure is near or below a minimum operating temperature of the electronic system.

In Example A17, the subject matter of any of Examples A1-A6 can optionally include where the at least one first housing heating element and the at least one second housing heating element are metal wires.

In Example A18, the subject matter of any of Examples A1-A7 can optionally include where at least one first housing heating element is embedded into the first housing and the at least one second housing heating element is embedded into the second housing.

In Example A19, the subject matter of any of Examples A1-A8 can optionally include where the electronic system includes a liquid cooled cold plate.

In Example A20, the subject matter of any of Examples A1-A9 can optionally include where the electronic system is an onboard controller for a vehicle.

In Example A21, the subject matter of any of Examples A1-A10 can optionally include where the vehicle is an autonomous vehicle.

In Example A22, the subject matter of any of Examples A1-A11 can optionally include where the enclosure is located behind a seat of the vehicle.

Example M1 is a method to enable active condensation mitigation inside an enclosure for an electronic system, the method including determining a current relative humidity of an environment inside the enclosure, determining a current maximum temperature of the environment inside the enclosure, using the current relative humidity and the current maximum temperature to determine a dew point for the environment inside the enclosure, determining a current minimum temperature of the environment inside the enclosure, and activating one or more heating elements inside the enclosure when the current minimum temperature is the same or lower than the dew point for the environment inside the enclosure.

In Example M2, the subject matter of Example M1 can optionally include where the one or more heating elements are each independently controlled.

In Example M3, the subject matter of Example M1 can optionally include de-activating the one or more heating elements in the enclosure when the current minimum temperature is higher than the dew point for the environment inside the enclosure.

In Example M4, the subject matter of Example M1 can optionally include opening one or more vents in the enclosure when the current minimum temperature is the same or lower than the dew point for the environment inside the enclosure.

In Example M5, the subject matter of Example M4 can optionally include where the one or more vents are each independently controlled.

In Example, M6, the subject matter of Example M4 can optionally include where closing the one or more vents in the enclosure when the current minimum temperature is higher than the dew point for the environment inside the enclosure.

In Example, M7, the subject matter of Example M1 can optionally include determining that the electronic system has been activated, and allowing the system to power on when the current minimum temperature is higher than the dew point for the environment inside the enclosure.

In Example, M8, the subject matter of Example M1 can optionally include where the one or more heating elements are activated by a heating element activation module.

In Example, M9, the subject matter of Example M1 can optionally where the enclosure includes a battery that powers the heating element activation module and is separate from a system battery.

In Example, M10, the subject matter of Example M1 can optionally include where the one or more heating elements are metal wires.

In Example, M11, the subject matter of Example M1 can optionally include where the one or more heating elements are embedded into the enclosure.

In Example, M12, the subject matter of Example M1 can optionally include where the electronic system is an onboard controller for a vehicle.

In Example, M13, the subject matter of Example M12 can optionally include where the vehicle is an autonomous vehicle.

In Example, M14, the subject matter of Example M1 can optionally include where the enclosure includes a first housing and a second housing, wherein the first housing includes at least one first housing temperature sensor to help determine the maximum and minimum temperature inside the enclosure, at least one first housing humidity sensor to help determine the relative humidity inside the enclosure, at least one heating element to heat the environment inside the enclosure, and a heating element activation module to control activation and de-activation of the heating element.

In Example, M15, the subject matter of Example M14 can optionally include where the second housing includes at least one second housing temperature sensor to help determine the maximum and minimum temperature inside the enclosure, at least one second housing humidity sensor to help determine the relative humidity inside the enclosure, and at least one second heating element to heat the environment inside the enclosure, wherein the first housing is coupled to the second housing to create the enclosure for the electronic system.

In Example M18, the subject matter of any of Examples M1-M2 can optionally include de-activating the one or more heating elements in the enclosure when the current minimum temperature is higher than the dew point for the environment inside the enclosure.

In Example M19, the subject matter of any of Examples M1-M3 can optionally include opening one or more vents in the enclosure when the current minimum temperature is the same or lower than the dew point for the environment inside the enclosure.

In Example M20, the subject matter of any of Examples M1-M4 can optionally include where the one or more vents are each independently controlled.

In Example, M21, the subject matter of any of Examples M1-M5 can optionally include closing the one or more vents in the enclosure when the current minimum temperature is higher than the dew point for the environment inside the enclosure.

In Example, M22, the subject matter of any of Examples M1-M6 can optionally include determining that the electronic system has been activated, and allowing the system to power on when the current minimum temperature is higher than the dew point for the environment inside the enclosure.

In Example, M23, the subject matter of any of Examples M1-M7 can optionally include where the one or more heating elements are activated by a heating element activation module.

In Example, M24, the subject matter of any of Examples M1-M8 can optionally where the enclosure includes a battery that powers the heating element activation module and is separate from a system battery.

In Example, M25, the subject matter of any of the Examples M1-M9 can optionally include where the one or more heating elements are metal wires.

In Example, M26, the subject matter of any of the Examples M1-M10 can optionally include where the one or more heating elements are embedded into the enclosure.

In Example, M27, the subject matter of any of the Examples M1-M11 can optionally include where the electronic system is an onboard controller for a vehicle.

In Example, M28, the subject matter of any of the Examples M1-M12 can optionally include where the vehicle is an autonomous vehicle.

In Example, M29, the subject matter of any of the Examples M1-M13 can optionally include where the enclosure includes a first housing and a second housing, wherein the first housing includes at least one first housing temperature sensor to help determine the maximum and minimum temperature inside the enclosure, at least one first housing humidity sensor to help determine the relative humidity inside the enclosure, at least one heating element to heat the environment inside the enclosure, and a heating element activation module to control activation and de-activation of the heating element.

In Example, M30, the subject matter of any of the Examples M1-M14 can optionally include where the second housing includes at least one second housing temperature sensor to help determine the maximum and minimum temperature inside the enclosure, at least one second housing humidity sensor to help determine the relative humidity inside the enclosure, and at least one second heating element to heat the environment inside the enclosure, wherein the first housing is coupled to the second housing to create the enclosure for the electronic system.

Example AA1 is a device including at least one machine-readable medium located in an enclosure that at least partially contains an electronic system, the at least one machine-readable medium comprising one or more instructions that, when executed by at least one processor, causes the at least one processor to determine a current relative humidity of an environment inside the enclosure, determine a current maximum temperature of the environment inside the enclosure, use the current relative humidity and the current maximum temperature to determine a dew point for the environment inside the enclosure, determine a current minimum temperature of the environment inside the enclosure, and activate one or more heating elements inside the enclosure when the current minimum temperature is the same or lower than the dew point for the environment inside the enclosure.

In Example AA2, the subject matter of Example AA1 can optionally include one or more instructions that, when executed by at least one processor, causes the at least one processor to determine that the electronic system has been activated and allow the system to power on when the current minimum temperature is higher than the dew point for the environment inside the enclosure.

In Example AA3, the subject matter of Example AA1 can optionally include where the enclosure includes a battery that powers the at least one processor and is separate from a power source for the electronic system.

In Example AA4, the subject matter of Example AA1 can optionally include where the one or more heating elements are each independently controlled.

In Example AA5, the subject matter of Example AA1 can optionally include one or more instructions that, when executed by at least one processor, causes the at least one processor to de-activate the one or more heating elements in the enclosure when the current minimum temperature is higher than the dew point for the environment inside the enclosure.

In Example AA6, the subject matter of Example AA1 can optionally include one or more instructions that, when executed by at least one processor, causes the at least one processor to open one or more vents in the enclosure when the current minimum temperature is the same or lower than the dew point for the environment inside the enclosure.

In Example AA7, the subject matter of Example AA6 can optionally include where the one or more vents elements are each independently controlled.

In Example AA8, the subject matter of Example AA6 can optionally include one or more instructions that, when executed by at least one processor, causes the at least one processor to close the one or more vents in the enclosure when the current minimum temperature is higher than the dew point for the environment inside the enclosure.

In Example AA9, the subject matter of any of Examples AA1-AA2 can optionally include where the enclosure includes a battery that powers the at least one processor and is separate from a power source for the electronic system.

In Example AA10, the subject matter of any of Examples AA1-AA3 can optionally include where the one or more heating elements are each independently controlled.

In Example AA11, the subject matter of any of Examples AA1-AA4 can optionally include one or more instructions that, when executed by at least one processor, causes the at least one processor to de-activate the one or more heating elements in the enclosure when the current minimum temperature is higher than the dew point for the environment inside the enclosure.

In Example AA12, the subject matter of any of Examples AA1-AA5 can optionally include one or more instructions that, when executed by at least one processor, causes the at least one processor to open one or more vents in the enclosure when the current minimum temperature is the same or lower than the dew point for the environment inside the enclosure.

In Example AA13, the subject matter of any of Examples AA1-AA6 can optionally include where the one or more vents elements are each independently controlled.

In Example AA14, the subject matter of any of Examples AA1-AA7 can optionally include one or more instructions that, when executed by at least one processor, causes the at least one processor to close the one or more vents in the enclosure when the current minimum temperature is higher than the dew point for the environment inside the enclosure.

Example MM1 is a method to enable active condensation mitigation inside an enclosure for an electronic system, the method including determining a current relative humidity of an environment inside the enclosure, determine a current maximum temperature of the environment inside the enclosure, using the current relative humidity and the current maximum temperature to determine a dew point for the environment inside the enclosure, determining a current minimum temperature of the environment inside the enclosure, and activating one or more heating elements inside the enclosure when the current minimum temperature is the same or lower than the dew point for the environment inside the enclosure.

In Example MM2, the subject matter of Example MM1 can optionally include determining that the electronic system has been activated and allow the system to power on when the current minimum temperature is higher than the dew point for the environment inside the enclosure.

In Example MM3, the subject matter of Example MM1 can optionally include where the enclosure includes a battery that powers the at least one processor and is separate from a power source for the electronic system.

In Example MM4, the subject matter of Example MM1 can optionally include where the one or more heating elements are each independently controlled.

In Example MM5, the subject matter of any of Example MM1 can optionally include de-activating the one or more heating elements in the enclosure when the current minimum temperature is higher than the dew point for the environment inside the enclosure.

In Example, MM6, the subject matter of Example MM1 can optionally include opening one or more vents in the enclosure when the current minimum temperature is the same or lower than the dew point for the environment inside the enclosure.

In Example, MM7, the subject matter of Example MM6 can optionally include where the one or more vents elements are each independently controlled.

In Example, MM8, the subject matter of Example MM1 can optionally include closing the one or more vents in the enclosure when the current minimum temperature is higher than the dew point for the environment inside the enclosure.

In Example MM12, the subject matter of any of the Examples MM1-MM2 can optionally include where the enclosure includes a battery that powers the at least one processor and is separate from a power source for the electronic system.

In Example MM13, the subject matter of any of the Examples MM1-MM3 can optionally include where the one or more heating elements are each independently controlled.

In Example MM14, the subject matter of any of the Examples MM1-MM4 can optionally include de-activating the one or more heating elements in the enclosure when the current minimum temperature is higher than the dew point for the environment inside the enclosure.

In Example, MM15, the subject matter of any of the Examples MM1-MM5 can optionally include opening one or more vents in the enclosure when the current minimum temperature is the same or lower than the dew point for the environment inside the enclosure.

In Example, MM16, the subject matter of any of the Examples MM1-MM6 can optionally include where the one or more vents elements are each independently controlled.

In Example, MM17, the subject matter of any of the Examples MM1-MM7 can optionally include closing the one or more vents in the enclosure when the current minimum temperature is higher than the dew point for the environment inside the enclosure.

What is claimed is:

1. An enclosure for an electronic system, the enclosure comprising:
    a first housing, wherein the first housing includes:
        at least one first housing temperature sensor;
        at least one first housing humidity sensor;
        at least one first housing heating element; and
        a heating element activation module to control activation and de-activation of the at least one first housing heating element; and
    a second housing, wherein the second housing includes:
        at least one second housing temperature sensor;
        at least one second housing humidity sensor; and
        at least one second housing heating element,
    wherein the first housing is coupled to the second housing to create the enclosure for the electronic system and the heating element activation module controls activation and de-activation of the at least one second housing heating element.

2. The enclosure of claim 1, wherein the first housing and/or the second housing includes one or more vents and the heating element activation module controls opening and closing of each of the one or more vents.

3. The enclosure of claim 1, further comprising:
    a plurality of first housing heating elements, wherein the heating element activation module independently controls activation and de-activation of each one of the plurality of first housing heating elements.

4. The enclosure of claim 1, further comprising:
    a battery separate from a battery of the electronic system, wherein the heating element activation module is discrete and separate from the electronic system.

5. The enclosure of claim 1, wherein the at least one first housing heating element and/or the at least one second housing heating element are activated when a temperature in the enclosure is near or below a dew point.

6. The enclosure of claim 1, wherein the at least one first housing heating element and/or the at least one second housing heating element are activated when a temperature in the enclosure is near or below a minimum operating temperature of the electronic system.

7. The enclosure of claim 1, wherein the electronic system includes a liquid cooled cold plate.

8. The enclosure of claim 1, wherein the electronic system is an onboard controller for a vehicle.

* * * * *